US011425000B2

(12) United States Patent
Patodia et al.

(10) Patent No.: US 11,425,000 B2
(45) Date of Patent: Aug. 23, 2022

(54) ON-THE-FLY REORGANIZATION OF DIRECTED ACYCLIC GRAPH NODES OF A COMPUTING SERVICE FOR HIGH INTEGRATION FLEXIBILITY

(71) Applicant: PayPal, Inc., San Jose, CA (US)

(72) Inventors: Prabin Patodia, Bangalore (IN); Sumit Kumar, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 44 days.

(21) Appl. No.: 16/918,578

(22) Filed: Jul. 1, 2020

(65) Prior Publication Data
US 2022/0006706 A1  Jan. 6, 2022

(51) Int. Cl.
*H04L 41/5009* (2022.01)
*H04L 41/5019* (2022.01)
(Continued)

(52) U.S. Cl.
CPC ...... *H04L 41/5009* (2013.01); *H04L 41/5006* (2013.01); *H04L 41/5019* (2013.01); *H04L 67/101* (2013.01)

(58) Field of Classification Search
CPC ..... H04L 41/12; H04L 67/10; H04L 43/0864; H04L 43/0876; H04L 45/22; H04L 45/24;
(Continued)

(56) References Cited

U.S. PATENT DOCUMENTS

| 2014/0201124 A1* | 7/2014 | Proctor | G06N 5/047 706/47 |
| 2016/0072676 A1* | 3/2016 | Gomadam | H04L 41/0843 709/221 |

(Continued)

*Primary Examiner* — Djenane M Bayard
(74) *Attorney, Agent, or Firm* — Amin, Turocy & Watson, LLP

(57) ABSTRACT

Systems and techniques that facilitate on-the-fly reorganization of directed acyclic graph nodes of a computing service for high integration flexibility are provided. In various embodiments, an input component can receive from a computing client a requested response time to be satisfied by a computing service. In various embodiments, a node property component can access an execution matrix. In various cases, the execution matrix can list execution properties of a plurality of nodes corresponding to the computing service. In various instances, the plurality of nodes can respectively perform a plurality of sub-operations associated with the computing service. In various aspects, the plurality of nodes can include one or more multi-level-of-execution subsets of nodes. In various cases, each multi-level-of-execution subset can contain at least two nodes that facilitate a same sub-operation at different levels of resource utilization. In various embodiments, a node identification component can identify a set of nodes from the plurality of nodes listed in the execution matrix, such that the identified set can include one node from each of the multi-level-of-execution subsets, and such that the execution properties of the identified set can collectively satisfy the requested response time. In various aspects, the node identification component can build for the computing client a workflow corresponding to the computing service based on the identified set.

20 Claims, 16 Drawing Sheets

(51) Int. Cl.
*H04L 67/101* (2022.01)
*H04L 41/5006* (2022.01)

(58) Field of Classification Search
CPC . H04L 67/1097; H04L 45/745; H04L 67/104; H04L 41/22; H04L 41/0806; H04L 47/70; H04L 63/20; H04L 45/121; H04L 43/08; H04L 45/64; H04L 45/02; H04L 41/0843; H04L 41/145; H04L 45/125; H04L 67/02; H04L 29/06; H04L 41/5009; H04L 41/5038; H04L 41/5096; H04L 43/04; H04L 45/586; H04L 67/1008; H04L 41/18; H04L 45/124; H04L 47/82; H04L 29/08135; H04L 41/5029; H04L 41/5074; H04L 45/12; H04L 45/42; H04L 47/782; H04L 67/306; H04L 67/327; H04L 69/08; H04L 69/18; H04L 2209/38; H04L 45/122; H04L 45/123; H04L 45/50; H04L 45/68; H04L 45/70; H04L 47/12; H04L 63/1466; H04L 69/22; H04L 9/088; H04L 9/0894; H04L 9/3236; H04L 9/3239; H04L 12/4625; H04L 2209/56; H04L 41/0816; H04L 41/0886; H04L 41/0893; H04L 41/14; H04L 41/142; H04L 41/5006; H04L 41/5019; H04L 67/101
See application file for complete search history.

(56) References Cited

U.S. PATENT DOCUMENTS

2019/0349426 A1* 11/2019 Smith .................... H04L 41/12
2020/0104402 A1* 4/2020 Burnett ................ G06F 16/243

* cited by examiner

EXECUTION MATRIX 500

| NODE IDENTIFIER | FUNCTION | RESOURCE UTILIZATION | MANDATORY vs. OPTIONAL | SYNCHRONOUS vs. ASYNCHRONOUS | EXECUTION TIME (ms) |
|---|---|---|---|---|---|
| Node 1 | Request Validation | N/A | M | S | 20 |
| Node 2 | Request Conversion | N/A | M | S or A | 50 |
| Node 3 | Data Loading | Lite | O | S | 200 |
| Node 4 | Data Loading | Complete | O | S | 400 |
| Node 5 | Rule Execution | Ultra-Lite | O | S | 50 |
| Node 6 | Rule Execution | Lite | O | S | 100 |
| Node 7 | Rule Execution | Complete | O | S | 200 |
| Node 8 | Post Rule Execution Service Call | N/A | M | S or A | 50 |
| Node 9 | Post Rule Execution Database Call | N/A | M | S or A | 50 |
| Node 10 | Response Building | N/A | M | S | 10 |

FIG. 5

ON-THE-FLY REORGANIZATION OF DIRECTED ACYCLIC GRAPH NODES OF A COMPUTING SERVICE FOR HIGH INTEGRATION FLEXIBILITY

TECHNICAL FIELD

The subject disclosure relates generally to computing services, and more specifically to on-the-fly reorganization of directed acyclic graph nodes of a computing service to facilitate high integration flexibility.

BACKGROUND

Conventionally, customized and/or ad hoc integration solutions are required to facilitate integration between a computing client and a best-effort computing service that does not satisfy a service level agreement (SLA) specified and/or requested by the computing client. That is, a computing client attempts to integrate with a computing service by requesting a specific SLA to be satisfied, fulfilled, and/or met by the computing service. If the computing service is a best-effort service that fails to meet the requirements of the specified SLA, integration can be facilitated only through customized and/or ad hoc integration solutions. In other words, the computing service is updated through extensive recoding and/or reprogramming so that the updated computing service satisfies the requirements of the specified SLA. Such customized and/or ad hoc integration solutions are highly time-intensive and inefficient (e.g., can take weeks and/or months, in some cases), and they can require several cycles and/or iterations of manual reprogramming before the computing service is able to satisfy the specified SLA.

Systems and/or techniques that can ameliorate one or more of these issues are desirable.

BRIEF DESCRIPTION OF THE DRAWINGS

FIG. 5 illustrates a high-level block diagram of an example, non-limiting execution data structure that facilitates on-the-fly reorganization of directed acyclic graph nodes of a computing service in accordance with one or more embodiments described herein.

DETAILED DESCRIPTION

Figure 1:
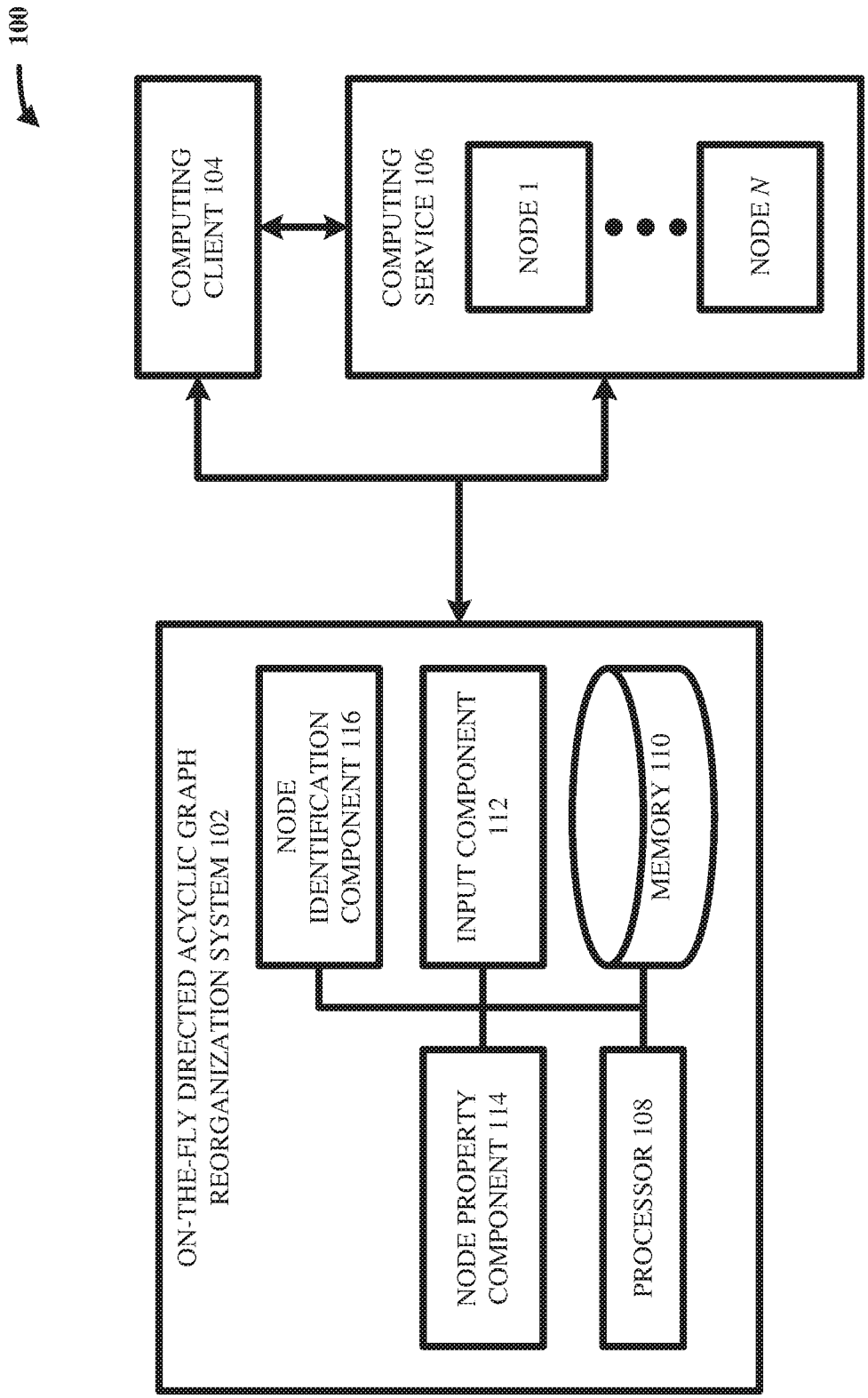
FIG. 1 illustrates a high-level block diagram of an example, non-limiting system that facilitates on-the-fly reorganization of directed acyclic graph nodes of a computing service in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Modern computerized transaction systems often implement a service-oriented architecture. A service-oriented architecture can be a computing system and/or network that includes one or more computing services with which a computing client can interact and/or integrate. A computing service can be any suitable combination of hardware and/or software that amounts to a discrete unit of functionality which can be accessed remotely and/or which can be acted upon and/or updated independently. A computing service can have its own application programming interface (API) and can be configured to perform one or more particular computing tasks and/or operations (e.g., retrieving particular data from a particular database and/or data structure, performing a particular computation, performing a particular encryption and/or decryption, creating particular documents and/or files; distributing and/or transmitting particular data to particular audiences; cross-referencing and/or cross-checking particular data with known data, providing particular decisions and/or predictions and/or estimations). In various aspects, a computing client can be any suitable combination of computer hardware and/or software that can provide input to a computing service and/or that can receive output from a computing service.

In various cases, a computing client can attempt to integrate to and/or interact with a computing service. When doing so, the computing client can request and/or specify a particular service level agreement (SLA) to be satisfied, fulfilled, and/or otherwise met by the computing service. The SLA can specify a response time threshold (e.g., a maximum amount of processing time which the computing service is permitted to take when interacting and/or integrating with the computing client) and/or a response quality threshold (e.g., a minimum level of decision quality, decision completeness, decision confidence, decision accuracy, and/or resource utilization that the computing service is required to yield when interacting and/or integrating with the computing client).

When the computing service is a best effort service that does not meet the specified SLA, customized and/or ad hoc integration solutions are conventionally required to facilitate integration between the computing client and the computing service. That is, a computing client can attempt to integrate with a computing service by requesting a specific SLA to be satisfied, fulfilled, and/or met by the computing service. As mentioned above, the specified SLA can indicate a response time threshold and/or a response quality threshold to be met by the computing service. Conventionally, when the computing service is a best-effort service that fails to meet one or more of the requirements indicated in the specified SLA (e.g., when the computing service cannot provide results within the response time threshold and/or cannot provide results at or above the response quality threshold), integration between the computing client and the computing service can be facilitated only through customized and/or ad hoc integration solutions. Such customized and/or ad hoc integration solutions generally require the computing service to be updated through extensive recoding and/or reprogramming so that the updated computing service satisfies the requirements indicated in the specified SLA (e.g., such that the computing service can now provide results within the response time threshold and/or can now provide results that are at or above the response quality threshold). However, such customized and/or ad hoc integration solutions are highly time-intensive and inefficient (e.g., can take weeks and/or months, in some cases), and they can require several cycles and/or iterations of manual reprogramming before the computing service is able to satisfy the specified SLA.

Various embodiments of the subject innovation can address one or more of these issues/problems by facilitating on-the-fly reorganization of directed acyclic graph nodes of a computing service for high integration flexibility. One or more embodiments described herein include systems, computer-implemented methods, apparatus, and/or computer program products that can facilitate on-the-fly reorganization of directed acyclic graph (DAG) nodes of a computing service in a service-oriented architecture. In various aspects, such on-the-fly reorganization of DAG nodes of a computing service can promote and/or improve the integration flexibility of the computing service. Specifically, various embodiments of the subject innovation can enable a best-effort computing service to integrate with a computing client, even when the best-effort computing service does not initially satisfy a specified SLA (e.g., does not satisfy a requested response time threshold and/or a requested response quality threshold) indicated by the computing client. In other words, embodiments of the subject innovation can enable a computing service to integrate with a computing client in situations where conventional systems and/or techniques cannot enable such integration without extensive manual reprogramming. Thus, various embodiments of the subject innovation can improve the performance of computing systems, and thus constitute a concrete and tangible technical improvement in the field of service-oriented architectures.

In various embodiments, a computing service can be decomposed into a plurality of nodes. In various aspects, each node can be any suitable combination of hardware and/or software that can facilitate a discrete unit of sub-functionality associated with the computing service. For example, suppose that a computing service can facilitate an overall function and/or operation in response to a computing request from a computing client (e.g., retrieving particular data from a particular database and/or data structure, performing a particular computation, performing a particular encryption and/or decryption, creating particular documents and/or files; distributing and/or transmitting particular data to particular audiences; cross-referencing and/or cross-checking particular data with known data, providing particular decisions and/or predictions and/or estimations). In various aspects, the overall function and/or operation can be considered as being made up of multiple sub-functions and/or sub-operations. Non-limiting examples of such sub-functions and/or sub-operations can include receiving the computing request from the computing client, validating the computing request, converting and/or formatting the computing request, importing and/or accessing a data load required to process the computing request, processing the computing request via execution of rules corresponding to the computing service, making a service call after and/or while processing the computing request, making a database call after and/or while processing the computing request, writing to a database after and/or while processing the computing request, building a response and/or decision after processing the computing request, and/or transmitting the response and/or decision after processing the computing request. In various aspects, any other suitable sub-function and/or sub-operation can be implemented. When the multiple sub-functions and/or sub-operations are suitably combined (e.g., when the multiple sub-functions and/or sub-operations are executed in parallel and/or in series in any suitably arranged graph, workflow, and/or transaction flow), they can collectively amount to the overall function and/or operation of the computing service. In other words, in various instances, the overall function and/or operation of the computing service can be considered as having multiple computing steps/acts, and each node of the plurality of nodes can perform and/or facilitate a corresponding computing step/act of the multiple computing steps/acts. In various aspects, each node can be considered as a microservice of the computing service, and the plurality of nodes can collectively work together to provide the overall functionality of the computing service.

In various embodiments of the subject innovation, the plurality of nodes can comprise one or more multi-level-of-execution subsets of nodes. In various aspects, a multi-level-of-execution subset can contain at least two nodes that can independently perform and/or facilitate a same sub-function and/or sub-operation associated with the computing service, and the at least two nodes can independently perform and/or facilitate that same sub-function and/or sub-operation at different levels of decision quality, decision completeness, decision confidence, decision accuracy, and/or resource utilization. In various aspects, this can cause the at least two nodes to exhibit different amounts of execution/processing times and/or different response quality/confidence levels. In other words, each multi-level-of-execution subset can respectively correspond to a sub-function and/or sub-operation associated with the computing service. Thus, a given multi-level-of-execution subset can correspond to a particular sub-operation and/or sub-function. In various aspects, the given multi-level-of-execution subset can contain multiple nodes, each of which can independently facilitate and/or perform the particular sub-function and/or sub-operation. Furthermore, in various cases, the multiple nodes in the given multi-level-of-execution subset can differ from one another in their levels of decision quality, decision completeness, decision confidence, decision accuracy, and/or resource utilization. That is, one node in the given multi-level-of-execution subset can facilitate and/or perform the particular sub-function and/or sub-operation at a highest level of decision quality, at a highest level of decision completeness, at a highest level of decision accuracy, at a highest level of decision confidence, and/or at a highest level of resource utilization; another node in the given multi-level-of-execution subset can facilitate and/or perform the same particular sub-function and/or sub-operation at an intermediate level of decision quality, at an intermediate level of decision completeness, at an intermediate level of decision accuracy, at an intermediate level of decision confidence, and/or at an intermediate level of resource utilization; and still another node in the multi-level-of-execution subset can facilitate and/or perform the same particular sub-function and/or sub-operation at a lowest level of decision quality, at a lowest level of decision completeness, at a lowest level of decision accuracy, at a lowest level of decision confidence, and/or at a lowest level of resource utilization. Accordingly, the one node can facilitate and/or perform the particular sub-function and/or sub-operation most accurately and/or most confidently and with a longest execution/processing/computation time; the another node can facilitate and/or perform the same particular sub-function and/or sub-operation at an intermediate level of accuracy and/or intermediate level of confidence and with an intermediate execution/processing/computation time; and the still another node can facilitate and/or perform the same particular sub-function and/or sub-operation least accurately and/or least confidently and with a shortest execution/processing/computation time. In various aspects, a multi-level-of-execution subset can contain any suitable number of nodes, and thus can represent any suitable number of levels of decision quality, decision completeness, decision accuracy, decision confidence, and/or resource utilization.

To help illustrate this concept, consider the following non-limiting example. Suppose that a computing service performs and/or facilitates an overall operation, and suppose that the overall operation can be made up of a first sub-operation, a second sub-operation, and a third sub-operation. In various aspects, even though the overall operation can be made up of three sub-operations, the computing service can, in some cases, be decomposed into more than three nodes (e.g., the number of nodes associated with the computing service can be greater than the number of unique sub-operations associated with the computing service). For instance, suppose that the computing service can be decomposed into a first node, a second node, a third node, a fourth node, and a fifth node. In various aspects, the first node can perform and/or facilitate the first sub-operation. Similarly, the second node can perform and/or facilitate the second sub-operation. Lastly, the third node, the fourth node, and the fifth node can each independently perform and/or facilitate the third sub-operation at different levels of decision quality, decision completeness, decision accuracy, decision confidence, and/or resource utilization. That is, the third node can perform and/or facilitate the third sub-operation at a highest level of decision quality, decision completeness, decision accuracy, decision confidence, and/or resource utilization. This can cause the third node to exhibit a longest execution/processing/computation time (e.g., measured in milliseconds (ms)) as well as a highest and/or most accurate/confident response quality level. Similarly, the fourth node can perform and/or facilitate the third sub-operation at an intermediate level of decision quality, decision completeness, decision accuracy, decision confidence, and/or resource utilization. This can cause the fourth node to exhibit an intermediate execution/processing/computation time as well as an intermediate response quality/accuracy/confidence level. Lastly, the fifth node can perform and/or facilitate the third sub-operation at a lowest level of decision quality, decision completeness, decision accuracy, decision confidence, and/or resource utilization. This can cause the fifth node to exhibit a shortest execution/processing/computation time as well as a lowest and/or least accurate/confident response quality level. As shown by the third node, the fourth node, and the fifth node in this non-limiting example, a shorter execution/processing/computation time can, in some cases, be obtained at the cost of a decreased response quality and/or confidence level.

Based on this disclosure, in various aspects, those having ordinary skill in the art will understand how the execution/processing/computation time of a node can be varied and/or manipulated by varying and/or manipulating the level of decision quality, decision completeness, decision accuracy, decision confidence, and/or resource utilization of the node (e.g., by varying an amount of computing resources, an amount of processing power, and/or a number of calculations that are allocated to and/or incorporated into the node). For example, in various cases, the fifth node can perform and/or facilitate the third sub-operation by using fewer and/or less accurate (but quicker) calculations than the fourth node, and the fourth node can perform and/or facilitate the third sub-operation by using fewer and/or less accurate (but quicker) calculations than the third node.

In various aspects, the third node, the fourth node, and the fifth node can be considered together as forming a multi-level-of-execution subset of nodes. That is, the third node can independently perform a sub-operation (e.g., the third sub-operation) at a given level of decision quality, decision completeness, decision accuracy, decision confidence, and/or resource utilization (e.g., highest), the fourth node can independently perform the same sub-operation (e.g., the third sub-operation) at a different level of decision quality, decision completeness, decision accuracy, decision confidence, and/or resource utilization (e.g., intermediate), and the fifth node can independently perform the same sub-operation (e.g., the third sub-operation) at a still different level of decision quality, decision completeness, decision accuracy, decision confidence, and/or resource utilization (e.g., lowest). Thus, in various aspects, the fifth node can execute more quickly but less completely and/or less accurately than the fourth node, and the fourth node can execute more quickly but less completely and/or less accurately than the third node.

Note that in this non-limiting example, there is no multi-level-of-execution subset corresponding to the first sub-operation, because there is only a single node that can perform and/or facilitate the first sub-operation (e.g., the first node). Similarly, in this non-limiting example, there is no multi-level-of-execution subset that corresponds to the second sub-operation, because there is only a single node that can perform and/or facilitate the second sub-operation (e.g., the second node). However, in this non-limiting example, there is a multi-level-of-execution subset that corresponds to the third sub-operation, because there are at least two nodes that can independently perform and/or facilitate the third sub-operation at different levels of decision quality, decision completeness, decision accuracy, decision confidence, and/or resource utilization (e.g., the third node, the fourth node, and the fifth node). In other words, all the nodes in the exemplary multi-level-of-execution subset (e.g., the third node, the fourth node, and the fifth node) can independently perform the third sub-operation at different speeds and/or with different accuracies and/or confidence levels.

Note that in this non-limiting example, there are five nodes total that make up the computing service (e.g., the first node, the second node, the third node, the fourth node, and the fifth node), and there is only one multi-level-of-execution subset (e.g., containing the third node, the fourth node, and the fifth node). In various aspects, however, there can be any suitable number of nodes and/or any suitable number of multi-level-of-execution subsets. In various aspects, there can be a multi-level-of-execution subset corresponding to each sub-operation and/or sub-function of the computing service.

As mentioned above, in various instances, a computing service can be composed of a plurality of nodes that respectively facilitate a plurality of sub-functions and/or sub-operations corresponding to the computing service (e.g., the sub-functions and/or sub-operations can collectively amount to the overall function and/or operation of the computing service). Also as mentioned above, the plurality of nodes can include one or more multi-level-of-execution subsets, where a multi-level-of-execution subset contains nodes that perform a same sub-operation and/or sub-function at different levels of decision quality, decision completeness, decision accuracy, decision confidence, and/or resource utilization. In various aspects, an executable directed acyclic graph (DAG) corresponding to the computing service (e.g., a version and/or instance of the computing service) can be created by identifying/determining and/or chaining together various nodes from the plurality of nodes into a workflow and/or transaction flow. In some cases, the identified/determined nodes can include one node from each of the one or more multi-level-of-execution subsets. In some cases, the identified/determined nodes can also include each node that is not a member of any multi-level-of-execution subset. In various aspects, multiple executable DAGs (e.g., multiple workflows, and/or multiple versions and/or instances of the computing service) can be constructed and/or built by reorganizing (e.g., on-the-fly, in real time) the plurality of nodes (e.g., by identifying/determining different nodes from each of the multi-level-of-execution subsets). This can result in multiple executable DAGs (e.g., multiple workflows, and/or multiple versions and/or instances of the computing service) that have different total execution/processing/computation times and different total response quality levels.

Consider again the above non-limiting example involving the computing service that includes three sub-operations, five nodes, and one multi-level-of-execution subset corresponding to the third sub-operation. In various aspects, at least three different executable DAGs (e.g., at least three different workflows, and/or at least three different versions and/or instances of the computing service) can be created by leveraging the multi-level-of-execution subset. Specifically, a first executable DAG (e.g., a first workflow, and/or a first version and/or instance of the computing service) can be implemented in which the first node, the second node, and the third node are executed. Since the first node can facilitate and/or perform the first sub-operation, since the second node can facilitate and/or perform the second sub-operation, and since the third node can facilitate and/or perform the third sub-operation, the overall functionality of the computing service can be provided. Moreover, because the third node can perform and/or facilitate the third sub-operation at a highest level of decision quality, decision completeness, decision accuracy, decision confidence, and/or resource utilization, the first executable DAG (e.g., the first workflow, and/or the first version and/or instance of the computing service) can exhibit a commensurately high level of decision quality, decision completeness, decision accuracy, decision confidence, and/or resource utilization (e.g., a commensurately high accuracy/confidence level and a commensurately long runtime). In such case, the fourth node and the fifth node can be not executed and/or not part of the first executable DAG, since the fourth node and the fifth node perform and/or facilitate the same sub-operation as the third node and would thus be redundant. In various aspects, it can be said the first node, the second node, and the third node are identified, determined, selected, and/or chosen from the plurality of nodes, and it can be said that the first executable DAG is constructed and/or built from the first node, the second node, and the third node (e.g., constructed and/or built from the identified, determined, selected, and/or chosen nodes). In some cases, the nodes can execute synchronously (e.g., the first executable DAG can begin at the first node, proceed to the second node, and finally proceed to the third node). In some cases, the nodes can execute asynchronously (e.g., the first executable DAG can include executing the first node, the second node, and the third node all in parallel). In some cases, any suitable combination of synchronous and/or asynchronous execution can be facilitated depending upon the properties and/or operating contexts of the nodes (e.g., the first executable DAG can begin at the first node and then proceed to the second node and third node in parallel; the first executable DAG can begin at the first node and the second node in parallel and then proceed to the third node).

In various aspects, a second executable DAG (e.g., a second workflow, and/or a second version and/or instance of the computing service) can be implemented in which the first node, the second node, and the fourth node are executed. Since the first node can facilitate and/or perform the first sub-operation, since the second node can facilitate and/or perform the second sub-operation, and since the fourth node can facilitate and/or perform the third sub-operation, the overall functionality of the computing service can be provided. Moreover, because the fourth node can perform and/or facilitate the third sub-operation at an intermediate level of decision quality, decision completeness, decision accuracy, decision confidence, and/or resource utilization, the second executable DAG (e.g., the second workflow, and/or the second version and/or instance of the computing service) can exhibit a commensurately intermediate level of decision quality, decision completeness, decision accuracy, decision confidence, and/or resource utilization (e.g., a commensurately intermediate accuracy/confidence level and a commensurately intermediate runtime). In such case, the third node and the fifth node can be not executed and/or not part of the second executable DAG, since the third node and the fifth node perform and/or facilitate the same sub-operation as the fourth node and would thus be redundant. In various aspects, it can be said the first node, the second node, and the fourth node are identified, determined, selected, and/or chosen from the plurality of nodes, and it can be said that the second executable DAG is constructed and/or built from the first node, the second node, and the fourth node (e.g., constructed and/or built from the identified, determined, selected, and/or chosen nodes). In some cases, the nodes can execute synchronously (e.g., the second executable DAG can begin at the first node, proceed to the second node, and finally proceed to the fourth node). In some cases, the nodes can execute asynchronously (e.g., the second executable DAG can include executing the first node, the second node, and the fourth node all in parallel). In some cases, any suitable combination of synchronous and/or asynchronous execution can be facilitated depending upon the properties and/or operating contexts of the nodes (e.g., the second executable DAG can begin at the first node and then proceed to the second node and fourth node in parallel; the second executable DAG can begin at the first node and the second node in parallel and then proceed to the fourth node).

In various aspects, a third executable DAG (e.g., a third workflow, and/or a third version and/or instance of the computing service) can be implemented in which the first node, the second node, and the fifth node are executed. Since the first node can facilitate and/or perform the first sub-operation, since the second node can facilitate and/or perform the second sub-operation, and since the fifth node can facilitate and/or perform the third sub-operation, the overall functionality of the computing service can be provided. Moreover, because the fifth node can perform and/or facilitate the third sub-operation at a lowest level of decision quality, decision completeness, decision accuracy, decision confidence, and/or resource utilization, the third executable DAG (e.g., the third version and/or instance of the computing service) can exhibit a commensurately low level of decision quality, decision completeness, decision accuracy, decision confidence, and/or resource utilization (e.g., a commensurately low accuracy/confidence level and a commensurately short runtime). In such case, the third node and the fourth node can be not executed and/or not part of the third executable DAG, since the third node and the fourth node perform and/or facilitate the same sub-operation as the fifth node and would thus be redundant. In various aspects, it can be said the first node, the second node, and the fifth node are identified, determined, selected, and/or chosen from the plurality of nodes, and it can be said that the third executable DAG is constructed and/or built from the first node, the second node, and the fifth node (e.g., constructed and/or built from the identified, determined, selected, and/or chosen nodes). In some cases, the nodes can execute synchronously (e.g., the third executable DAG can begin at the first node, proceed to the second node, and finally proceed to the fifth node). In some cases, the nodes can execute asynchronously (e.g., the third executable DAG can include executing the first node, the second node, and the fifth node all in parallel). In some cases, any suitable combination of synchronous and/or asynchronous execution can be facilitated depending upon the properties and/or operating contexts of the nodes (e.g., the third executable DAG can begin at the first node and then proceed to the second node and fifth node in parallel; the third executable DAG can begin at the first node and the second node in parallel and then proceed to the fifth node).

In various instances, the third executable DAG (e.g., the third workflow, and/or the third version and/or instance of the computing service) can execute more quickly but with less accuracy and/or confidence than the second executable DAG (e.g., the second workflow, and/or the second version and/or instance of the computing service), and the second executable DAG (e.g., the second workflow, and/or the second version and/or instance of the computing service) can execute more quickly but with less accuracy and/or confidence than the first executable DAG (e.g., the first workflow, and/or the first version and/or instance of the computing service).

In this way, in various aspects, different executable DAGs, and thus different versions of the computing service having different overall execution/processing/computation times and different overall accuracy/quality/confidence levels, can be built and/or constructed by identifying, determining, selecting, and/or choosing different nodes from the one or more multi-level-of-execution subsets. In various aspects, different executable DAGs (e.g., different workflows, and/or different versions and/or instances of the computing service) can be created to accommodate different requested SLAs from a computing client. In other words, various embodiments of the subject innovation can receive as input a requested SLA from a computing client (e.g., specifying a response time threshold and/or a response quality threshold) and can produce as output an executable DAG (e.g., an executable workflow and/or an executable version of the computing service) that can satisfy the requested SLA.

In various embodiments, a system can implement on-the-fly (e.g., real-time) reorganization of DAG nodes in a computing service. In various aspects, the system can comprise an input component, a node property component, and a node identification component.

In various embodiments, the input component can receive from a computing client a requested SLA. In various aspects, the requested SLA can indicate a response time threshold to be satisfied by the computing service. In various cases, the response time threshold can be a maximum amount of processing time (e.g., measured in milliseconds) that the computing client desires to allow to the computing service (e.g., when prompted by a computing request from the computing client, the computing service must provide a response without exceeding the response time threshold). In various instances, the requested SLA can indicate a response quality threshold to be satisfied by the computing service. In various cases, the response quality threshold can be a minimum level of accuracy, completeness, and/or confidence (e.g., optimized, high, intermediate, degraded) that the computing client desires to allow the computing service (e.g., when prompted by a computing request from the computing client, the computing service must provide a response having an accuracy, completeness, and/or confidence that is not less than the response quality threshold).

In various embodiments, the node property component can electronically access an execution data structure (e.g., a matrix, a table, a chart, a relational database, a graph database) that lists execution properties of a plurality of nodes corresponding to the computing service. As explained above, the plurality of nodes can, in some cases, respectively correspond to a plurality of sub-functions and/or sub-operations of the computing service. Also as explained above, the plurality of nodes can, in some instances, include one or more multi-level-of-execution subsets of nodes. In various aspects, a multi-level-of-execution subset can correspond to a given sub-function and/or sub-operation, the multi-level-of-execution subset can contain all nodes in the plurality of nodes that independently perform and/or facilitate the given sub-function and/or sub-operation, and the nodes in the multi-level-of-execution subset can each have a different level of decision quality, decision completeness, decision accuracy, decision confidence, and/or resource utilization. In various instances, for each node, the execution properties listed in the execution data structure can include an indication of the sub-functionality of the node, an indication of the level of resource utilization and/or completeness and/or accuracy and/or confidence of the node, an indication of whether the node is mandatory or optional for the computing service, an indication of whether the node can execute synchronously and/or asynchronously, and/or an indication of the execution/processing/computation time of the node. In various aspects, the execution properties can include any other suitable information pertaining to the node. In various cases, each node that is a member of a multi-level-of-execution subset can be optional for the computing service (e.g., if a node is a member of a multi-level-of-execution subset, then that node is not the only one in the plurality of nodes that performs and/or facilitates its particular sub-function and/or sub-operation). In various cases, each node that is not a member of a multi-level-of-execution subset can be mandatory for the computing service (e.g., if a node is not a member of a multi-level-of-execution subset, then that node is the only one in the plurality of nodes that performs and/or facilitates its particular sub-function and/or sub-operation). In various other cases, however, even nodes that are not members of a multi-level-of-execution subset can be optional for the computing service.

In various embodiments, the node identification component can identify and/or determine a set of nodes from the plurality of nodes based on the execution data structure and based on the requested SLA of the computing client. In various aspects, the node identification component can construct, arrange, and/or organize the identified/determined nodes into an executable DAG (e.g., an executable workflow, and/or an executable version and/or instance of the computing service) that can satisfy the requested SLA. In other words, the node identification component can analyze the execution properties listed in the execution data structure in order to identify/determine from the plurality of nodes those nodes that will enable some version and/or instance of the computing service to fulfill the requested SLA (e.g., to identify/determine those nodes that can be arranged into an executable DAG and/or executable workflow that can provide a response that meets the response quality threshold without exceeding the response time threshold). Specifically, in various aspects, the identified/determined set can include one node from each multi-level-of-execution subset. Moreover, in various aspects, the execution properties of the identified/determined set can collectively satisfy the requested SLA.

In various embodiments, the system can further comprise an execution component. In various aspects, the execution component can actually execute the executable DAG generated by the node identification component. In other words, the execution component can integrate the computing client with the executable DAG (e.g., with the generated workflow, and/or with the generated version and/or instance of the computing service).

In various embodiments, the system can further comprise a logging component. In various aspects, the logging component can monitor, track, record, and/or log executions of each of the plurality of nodes over any suitable amount of time. In various instances, the logging component can statistically derive the execution properties of each of the plurality of nodes based on the monitored, tracked, recorded, and/or logged executions (e.g., in some cases, the logging component can determine an average execution/processing/computation time of a node based on actual execution/processing/computation times that the node has exhibited in the past). In various instances, the logging component can update the execution data structure based on the statistically derived execution properties. For instance, the execution data structure can list a first collection of execution properties at a first time, the logging component can monitor executions of the plurality of nodes between the first time and a second time, and the logging component can employ any suitable mathematical and/or statistical technique to generate updated and/or more recent execution properties based on the executions that are monitored between the first time and the second time. In various cases, the logging component can input those updated and/or more recent execution properties into the execution data structure.

In various embodiments, the system can further comprise a recommendation component. In various aspects, the recommendation component can generate and/or transmit an electronic message to the computing client in response to receiving the requested SLA from the computing client. In various aspects, the electronic message can indicate a maximum response quality level (e.g., a maximum accuracy and/or completeness and/or confidence level) that can be achieved by some version and/or instance of the computing service (e.g., by some executable DAG and/or executable workflow) within the response time threshold specified in the requested SLA. In other words, the recommendation component can, in some cases, inform the computing client of an upper limit which the requested response time threshold imposes on the response level quality, accuracy, and/or confidence of the computing service. In various embodiments, the electronic message can further indicate an increased response time threshold and an increased maximum response quality level that can be achieved by some version and/or instance of the computing service within the increased response time threshold. In other words, the recommendation component can, in some cases, inform the computing client of a quality/accuracy/confidence improvement that can be exhibited by some version and/or instance of the computing service when the requested response time threshold is increased by a given and/or predetermined amount.

In various embodiments, the recommendation component can make recommendations to the computing client based on one or more other computing services that are downstream of the computing service. Specifically, in various aspects, in addition to receiving a response time threshold and/or a response quality threshold from the computing client, the input component can, in some cases, receive a computing request that the computing client desires to have processed by the computing service. In some instances, the computing request (e.g., content of the computing request and/or metadata pertaining to the computing request) can indicate that proper and/or full handling/processing of the computing request requires processing by one or more other computing services, in addition to and/or after processing by the computing service. In some cases, the one or more other computing services can be downstream of the computing service; that is, the one or more other computing services can receive as input the output generated by the computing service with which the computing client desires to integrate. In some instances, the one or more other computing services can require a threshold level of input accuracy, confidence, and/or quality in order to properly function. Thus, if the computing service with which the computing client desires to integrate outputs a result that lacks required accuracy, confidence, and/or quality, the processing/computations performed by the one or more other computing services that are downstream of the computing service can be corrupted and/or otherwise negatively impacted. In various instances, the recommendation component can identify processing requirements of the one or more other computing services via any suitable technique (e.g., by communicating with the one or more other computing services, by accessing a database that contains such information). In such cases, the recommendation component can determine whether a response time threshold and/or a response quality threshold specified by the computing client allow the computing service to generate a maximum quality, accuracy, and/or confidence level that satisfies and/or meets the processing requirements of the one or more other computing services.

Consider the following non-limiting illustration. Suppose that a computing client desires to have service Q process its computing request S; that is, the computing client desires to integrate with service Q. Furthermore, suppose that full handling and/or processing of the computing request S requires some processing to be performed by service Q and also requires subsequent processing to be performed by service R. In such case, service R can be said to be downstream of service Q (e.g., service R can take as input the output generated by service Q). Suppose that the processing requirements of the service R stipulate that the input to service R must have a quality/accuracy/confidence level of at least L. In various aspects, the input component can receive from the computing client the computing request S as well as a requested time threshold T. In various cases, the recommendation component can identify, based on the computing request S, that the computing request S is handleable by service Q and then by service R. The recommendation component can then identify via any suitable technique the processing requirements of the service R. In various instances, the response time threshold T can permit the service Q to generate a maximum accuracy/quality/confidence level that is less than L. In such case, the recommendation component can inform the computing client (e.g., via transmitting an electronic message) that, although some version of the service Q is capable of satisfying the response time threshold T, proper handling of the computing request S will require further processing by the downstream service R and that the response time threshold T is too short/low when the processing requirements of the downstream service R are taken into account. In such case, the recommendation component can, in various aspects, determine an increased response time threshold T* that allows the service Q to generate a response with a level of quality/accuracy/confidence of at least L, and the recommendation component can accordingly suggest to the computing client that the increased response time threshold T* be implemented instead of the original response time threshold T.

To help clarify some of the above-described embodiments of the subject innovation, consider the following non-limiting example. Suppose that a computing service can be composed of nodes A, B, C, D, E, and F. Further, suppose that node A can perform a sub-function W, that node B can perform a sub-function X, that node C can perform a sub-function Y at a highest level of resource utilization, that node D can perform the sub-function Y at an intermediate level of resource utilization, that node E can perform the sub-function Y at a lowest level of resource utilization, and that node F can perform a sub-function Z. That is, the computing service can comprise six nodes and four sub-functions, where one node facilitates the sub-function W, one node facilitates the sub-function X, three nodes independently facilitate the sub-function Y, and one node facilitates the sub-function Z. In such case, it can be said that a multi-level-of-execution subset of nodes corresponds to the sub-function Y since at least two nodes (e.g., C, D, and E) can independently perform the sub-function Y at different levels of resource utilization. In such case, there is no multi-level-of-execution subset corresponding to the sub-function W since fewer than two nodes can independently perform the sub-function W. Similarly, there is no multi-level-of-execution subset corresponding to the sub-function X since fewer than two nodes can independently perform the sub-function X. Likewise, there is no multi-level-of-execution subset corresponding to the sub-function Z since fewer than two nodes can independently perform the sub-function Z. In this non-limiting example, there is only one multi-level-of-execution subset (e.g., corresponding to the sub-function Y). In various other instances, any suitable number of multi-level-of-execution subsets can be implemented. In this non-limiting example, there are only three nodes (e.g., C, D, and E) in the multi-level-of-execution subset. In various other instances, any suitable number of nodes can be in the multi-level-of-execution subset.

In various aspects, the input component can receive a requested SLA from a computing client that desires to integrate with the computing service. In various instances, the requested SLA can indicate a response time threshold of 500 ms.

In various aspects, the node property component can access an execution data structure that lists and/or stores the execution properties of the nodes A, B, C, D, E, and F. In various aspects, the execution properties can include execution time of each node, level of resource utilization (e.g., and/or decision quality, decision completeness, decision accuracy, and/or decision confidence) of each node that is in a multi-level-of-execution subset, whether each node is mandatory or optional (e.g., nodes in a multi-level-of-execution subset can be optional while nodes not in a multi-level-of-execution subset can be mandatory), and/or whether each node can operate synchronously and/or asynchronously. Because the nodes C, D, and E are in a multi-level-of-execution subset, they can be marked as optional. Because the nodes A, B, and F are not in a multi-level-of-execution subset, they can be marked as mandatory. In various instances, suppose that node A has an execution time of 50 ms, that node B has an execution time of 80 ms, that node C has an execution time of 60 ms, that node D has an execution time of 220 ms, that node E has an execution time of 450 ms, and that node F has an execution time of 10 ms.

For simplicity of this non-limiting example, suppose that the nodes all operate synchronously (e.g., in series).

In various aspects, the node identification component can identify/determine a subset of the nodes A, B, C, D, E, and F based on the execution data structure and based on the response time threshold of the requested SLA, and can construct and/or build an executable DAG (e.g., an executable workflow, and/or an executable version and/or instance of the computing service) using the identified/determined nodes, such that the executable DAG can satisfy the requested SLA. In various aspects, the node identification component can identify/determine all the mandatory nodes (e.g., A, B, and F), and the node identification component can also identify/determine one node from each multi-level-of-execution subset (e.g., in this non-limiting example, there is only one multi-level-of-execution subset). Note that the node identification component cannot identify, determine, select, and/or choose the node E in this case. After all, if the node identification component identifies, determines, selects, or chooses the node E, the resulting executable DAG would comprise nodes A, B, E, and F. Since all the nodes operate synchronously in this example, the total execution time of the resulting executable DAG would be 590 ms (e.g., 50+80+450+10=590), which exceeds the response time threshold of 500 ms. In other words, although an executable DAG comprising the nodes A, B, E, and F would exhibit a highest level of accuracy, confidence, and/or quality (e.g., since the node E has a highest level of resource utilization as compared to the other nodes in the multi-level-of-execution subset), it would not satisfy the requested SLA of the computing client.

In various aspects, the node identification component can identify, determine, select, and/or choose the node D in this case. After all, if the node identification component identifies, determines, selects, and/or chooses the node D, the resulting executable DAG would comprise the nodes A, B, D, and F. Since all the nodes operate synchronously in this example, the total execution time of the resulting executable DAG would be 360 ms (e.g., 50+80+220+10=360), which does not exceed the response time threshold. In other words, an executable DAG comprising the nodes A, B, D, and F would exhibit an intermediate level of accuracy, confidence, and/or quality (e.g., since the node D has an intermediate level of resource utilization as compared to the other nodes in the multi-level-of-execution subset), and it would satisfy the requested SLA of the computing client.

In various instances, the node identification component can identify, determine, select, and/or choose the node C in this case. After all, if the node identification component identifies, determines, selects, and/or chooses the node C, the resulting executable DAG would comprise the nodes A, B, C, and F. Since all the nodes operate synchronously in this example, the total execution time of the resulting executable DAG would be 200 ms (e.g., 50+80+60+10=200), which does not exceed the response time threshold. In other words, an executable DAG comprising the nodes A, B, C, and F would exhibit a lowest level of accuracy, confidence, and/or quality (e.g., since the node C has a lowest level of resource utilization as compared to the other nodes in the multi-level-of-execution subset), and it would satisfy the requested SLA of the computing client.

In various aspects, the node identification component can have a preference for nodes that are of a higher level of resource utilization, quality, completeness, confidence, and/or accuracy. Thus, when more than one node in a multi-level-of-execution subset can be identified, determined, selected, and/or chosen such that the resulting executable DAG complies with the requested SLA, the node identification component can identify, determine, select, and/or choose the node from the more than one node that has a higher level of resource utilization, quality, completeness, confidence, and/or accuracy. In other words, in this non-limiting example, even though both the executable DAG comprising the nodes A, B, D, and F and the executable DAG comprising the nodes A, B, C, and F both satisfy the requested SLA, the node identification component can identify, determine, select, and/or choose the node D over the node C in view of the node D's higher level of resource utilization (e.g., and thus higher level of accuracy, confidence, quality, and/or completeness).

Overall, the system can receive as input the requested SLA from the computing client and can generate as output the executable DAG comprising the nodes A, B, D, and F. In various cases, the executable DAG comprising the nodes A, B, D, and F can be considered as a highest-quality workflow, version, instance, and/or configuration of the computing service that satisfies the requested SLA (e.g., although the executable DAG comprising the nodes A, B, E, and F would be of higher response quality, it does not satisfy the response time threshold of the requested SLA).

In various embodiments, the execution component can actually execute and/or implement the executable DAG (e.g., such that the generated version, instance, and/or configuration of the computing service is operable to interact with the computing client according to the computing client's requested SLA).

In various embodiments, the logging component can monitor actual executions of the nodes A, B, C, D, E, and F, can utilize any suitable mathematical and/or statistical technique to estimate the execution times of the nodes A, B, C, D, E, and F, and can update the execution data structure accordingly (e.g., can transmit and/or input the newly estimated and/or most recent execution times of the nodes A, B, C, D, E, and F to the execution data structure).

In various embodiments, the recommendation component can respond to the requested SLA by indicating that a response time threshold of 500 ms allows for a maximum response quality and/or accuracy level of intermediate (e.g., as explained above, the node identification component can determine that the lowest quality DAG comprising the nodes A, B, C, and F has a total execution time that does not exceed 500 ms, the intermediate quality DAG comprising the nodes A, B, D, and F has a total execution time that does not exceed 500 ms, and the highest quality DAG comprising the nodes A, B, E, and F has a total execution time that does exceed 500 ms). In various embodiments, the recommendation component can further inform the computing client that an additional 90 ms of processing time added to the response time threshold can allow the computing service to provide a highest quality response (e.g., the highest quality DAG comprising the nodes A, B, E, and F has a total execution time of 590 ms, which is 90 ms above the response time threshold of 500 ms).

As shown by this non-limiting example, various embodiments of the subject innovation can identify, determine, select, choose, arrange, and/or reorganize the nodes of the computing service in real-time as a response to receiving a requested SLA from the computing client. In this way, a suitable version and/or instance of the computing service (e.g., a suitable executable DAG) can be generated and/or created based on the requested SLA of the computing client, without requiring extensive manual reprogramming of the computing service. Indeed, if a conventional system and/or technique were implemented in the above example, the computing service would have only a single version and/or configuration with only a single overall accuracy and/or quality level. With conventional systems and/or techniques, if that single version and/or configuration does not satisfy the requested SLA of the computing client, integration between the computing client and the computing service cannot be performed unless the computing service is heavily manually customized.

Various embodiments of the subject innovation can be employed to use hardware and/or software to solve problems that are highly technical in nature (e.g., to facilitate on-the-fly reorganization of DAG nodes of a computing service for high integration flexibility), that are not abstract and that cannot be performed as a set of mental acts by a human. Further, some of the processes performed can be performed by a specialized computer (e.g., node property component, node identification component) for carrying out defined tasks related to on-the-fly reorganization of DAG nodes (e.g., receiving a requested response time to be satisfied by a computing service; accessing an execution data structure that lists execution properties of a plurality of nodes corresponding to the computing service, where the plurality of nodes respectively perform a plurality of sub-operations associated with the computing service, and where the plurality of nodes include one or more multi-level-of-execution subsets of nodes, with each multi-level-of-execution subset containing at least two nodes that facilitate a same sub-operation at different levels of resource utilization; identifying/determining a set of nodes from the plurality of nodes based on the execution data structure and based on the requested response time, where the identified/determined set includes one node from each of the one or more multi-level-of-execution subsets, and where the execution properties of the identified/determined set collectively satisfy the requested response time; and building an executable directed acyclic graph (DAG) based on the identified/determined set). Such defined tasks are not conventionally performed manually by humans. Moreover, neither the human mind nor a human with pen and paper can build or execute an executable DAG. Instead, various embodiments of the subject innovation are inherently and inextricably tied to computer technology and cannot be implemented outside of a computing environment (e.g., embodiments of the subject innovation constitute a computerized system that receives as input a requested SLA from a computing client and constructs as on-the-fly and/or real time output an executable version of the computing service that satisfies the requested SLA).

In various instances, embodiments of the invention can integrate into a practical application the disclosed teachings regarding on-the-fly reorganization of DAG nodes of a computing service for high integration flexibility. Indeed, in various embodiments, the disclosed teachings can provide a computerized system that receives defined input data (e.g., the requested SLA indicating a response time threshold to be met), analyzes the defined input data in view of defined stored data (e.g., the execution data structure), and generates as output one or more executable DAGs (e.g., one or more executable workflows, and/or one or more executable versions of the computing service) that can satisfy the defined input data (e.g., that can fulfill the requested SLA). In various embodiments, the computerized system can actually execute the resulting DAG, workflow, and/or version of the computing service, such that the computing client successfully integrates with the version of the computing service according to the requested SLA. In other words, such a computerized system can create on-the-fly and/or in real time a version and/or instance of the computing service that is automatically tailored to meet the SLA requirements specified by the computing client. Moreover, such a computerized system can eliminate the need to heavily and manually reprogram the computing service when the requested SLA is not initially satisfied (e.g., instead of having to manually reprogram the computing service so that it fulfills the requested SLA requirements, the computerized system can automatically create on-the-fly an executable DAG (a version and/or instance) corresponding to the computing service that satisfies the requested SLA requirements). This elimination and/or reduction in manual reprogramming certainly constitutes a technical improvement in the field of service-oriented architectures (e.g., embodiments of the subject innovation can enable integration between a computing service and a computing client even in certain situations where conventional systems and/or techniques would not be able to facilitate such integration). Thus, embodiments of the subject innovation clearly constitute a useful and practical application of computers.

Furthermore, various embodiments of the subject innovation can control real-world devices based on the disclosed teachings. For example, embodiments of the subject innovation can be implemented as a real-world computerized system in a real-world service-oriented architecture in which a real-world computing client attempts to integrate with a real-world computing service. In various embodiments, the computerized system can receive from the real-world computing client a response time threshold (e.g., a requested SLA). In various aspects, the real-world computerized system can access a real-world data structure that stores execution properties of multiple nodes corresponding to the real-world computing service. In various instances, the multiple nodes can respectively facilitate a plurality of real-world sub-operations associated with the real-world computing service. In various cases, the multiple nodes can include one or more multi-level-of-execution subsets of nodes, where a multi-level-of-execution subset contains at least two nodes that facilitate a same real-world sub-operation at different levels of resource utilization (e.g., at different levels of accuracy and/or with different processing times, where the level of accuracy for each node can be proportional to the processing time of the node). In various instances, the computerized system can identify, determine, select, and/or choose from the plurality of nodes a set of nodes based on the response time threshold and based on the real-world data structure, such that the identified/determined set includes one node from each multi-level-of-execution subset, and such that the execution properties of the identified/determined set collectively satisfy the response time threshold. In various aspects, the computerized system can construct a real-world DAG from the nodes in the identified/determined set. In various cases, the real-world DAG can be considered as a real-world version and/or instance of the computing service that satisfies the response time threshold specified by the real-world computing client. In some instances, a real-world electronic message can be transmitted by the computerized system to the real-world computing client, where the real-world electronic message indicates a maximum response quality level that is achievable by the real-world computing service within the response time threshold specified by the real-world computing client.

It should be appreciated that the herein figures are exemplary and non-limiting.

FIG. 1 illustrates a high-level block diagram of an example, non-limiting system 100 that can facilitate on-the-fly reorganization of directed acyclic graph nodes of a computing service in accordance with one or more embodiments described herein. As shown, a computing client 104 can attempt to integrate with a computing service 106. In various cases, an on-the-fly directed acyclic graph (DAG) reorganization system 102 can facilitate integration between the computing client 104 and the computing service 106. As explained herein, the computing client 104 can specify and/or request an SLA (e.g., a response time threshold and/or a response quality threshold) to be satisfied by the computing service 106. In various cases, the on-the-fly DAG reorganization system 102 can create in real-time a version and/or instance of the computing service 106 that satisfies the specified and/or requested SLA.

In various embodiments, the computing client 104 can be any suitable entity (e.g., machine, artificially intelligent robot/program, human via a desktop computer, human via a laptop computer, human via a mobile device, human via a tablet device, and/or otherwise) that has an objective to be fulfilled and/or furthered and which can electronically, digitally, and/or remotely interact with the computing service 106. In various aspects, the computing client 104 can be communicatively coupled to the computing service 106 via any suitable wired and/or wireless electronic connection.

In various embodiments, the computing service 106 can be any suitable combination of computer hardware and/or software that amounts to a discrete unit of functionality which can be accessed remotely and/or which can be acted upon and/or updated independently. In various aspects, the computing service 106 can be configured to perform an overall computing task, computing function, and/or computing operation when prompted by the computing client 104. In various instances, the computing service 106 can comprise N nodes for any suitable integer N (e.g., node 1, . . . , node N). In various aspects, each node of the N nodes can be any suitable combination of computer hardware and/or software that amounts to an executable, discrete unit of sub-functionality within the computing service 106. In other words, the computing service 106 can perform and/or facilitate an overall computing function and/or operation, and the N nodes can correspond to multiple computing sub-functions and/or sub-operations that collectively amount to the overall computing function and/or operation. For instance, the overall computing function and/or operation of the computing service 106 can be considered as comprising multiple computing steps/acts, and each of the N nodes can correspond to one of the multiple computing steps/acts. Non-limiting examples of computing sub-operations and/or sub-functions that can be facilitated and/or performed by the N nodes can include the following: validating a computing request from the computing client 104; converting and/or formatting the computing request; accessing and/or importing and/or loading a dataset needed to process the computing request; processing the computing request by executing computing rules associated with the computing service 106; making a service call after and/or while processing the computing request; making a database call after and/or while processing the computing request; writing to a database after and/or while processing the computing request; building a response after processing the computing request; and/or transmitting the response to the computing client 104.

In some cases, the computing service 106 can be a best effort service.

Although not explicitly shown in FIG. 1, the N nodes can include one or more multi-level-of-execution subsets of nodes. As explained above, a multi-level-of-execution subset can contain at least two nodes that independently perform and/or facilitate a same computing sub-operation and/or sub-function but at different levels of decision quality, decision completeness, decision accuracy, decision confidence, and/or resource utilization (e.g., which can yield different processing times).

As explained herein, the on-the-fly DAG reorganization system 102 can reorganize and/or rearrange in real-time the N nodes (and/or fewer than the N nodes) into an executable DAG (e.g., an executable workflow, and/or an executable version of the computing service 106) that can satisfy an SLA specified by the computing client 104.

In various aspects, as shown, the on-the-fly DAG reorganization system 102 can be communicatively and/or operatively and/or operably coupled to the computing client 104 and/or to the computing service 106 via any suitable wired and/or wireless electronic connection. In various other aspects (not shown), the on-the-fly DAG reorganization system 102 can be communicatively, operatively, and/or operably coupled to the computing service 106, and the computing service 106 can be communicatively, operatively, and/or operably coupled to the computing client 104, such that the on-the-fly DAG reorganization system 102 can be indirectly, rather than directly, coupled to the computing client 104 through the computing service 106. In still other aspects (not shown), the on-the-fly DAG reorganization system 102 can be implemented within and/or as a component of the computing service 106.

In various embodiments, the on-the-fly DAG reorganization system 102 can comprise a processor 108 (e.g., computer processing unit, microprocessor) and a computer-readable memory 110 that is operably and/or operatively and/or communicatively connected/coupled to the processor 108. The memory 110 can store computer-executable instructions which, upon execution by the processor 108, can cause the processor 108 and/or other components of the on-the-fly DAG reorganization system 102 (e.g., input component 112, node property component 114, node identification component 116) to perform one or more acts. In various embodiments, the memory 110 can store computer-executable components (e.g., input component 112, node property component 114, node identification component 116), and the processor 108 can execute the computer-executable components.

In various embodiments, the on-the-fly DAG reorganization system 102 can comprise an input component 112. In various aspects, the input component 112 can electronically, digitally, and/or remotely receive from the computing client 104 a requested response time and/or a requested response quality to be satisfied, fulfilled, and/or otherwise met by the computing service 106. In various aspects, the requested response time can be a maximum amount of time (e.g., measured in milliseconds) that the computing client 104 is willing to permit the computing service 106 to use. Similarly, the requested response quality can be a minimum level of quality and/or accuracy and/or completeness and/or confidence that the computing client 104 is willing to accept from the computing service 106. In various aspects, the requested response time and/or the requested response quality can be considered together as a specified SLA which the computing client 104 desires to be followed by the computing service 106. With conventional systems and/or techniques, if the requested response time and/or the requested response quality are not able to be satisfied by the computing service 106, integration between the computing service 106 and the computing client 104 cannot be facilitated without extensive and manual reprogramming and/or customization of the computing service 106. In various embodiments of the subject innovation, however, the on-the-fly DAG reorganization system 102 can create in real-time an executable DAG (e.g., an executable workflow, and/or an executable version and/or instance of the computing service 106) based on the N nodes of the computing service 106, such that the executable DAG can satisfy the requested response time and/or the requested response quality. In other words, the on-the-fly DAG reorganization system 102 can automatically generate a version and/or instance of the computing service 106 that is tailored to and/or that suits the needs of the computing client 104. In various aspects, this can be facilitated by reorganizing all and/or fewer than all of the N nodes of the computing service 106 into an executable DAG and/or an executable workflow based on the requested response time and/or the requested response quality.

In various embodiments, the on-the-fly DAG reorganization system 102 can comprise a node property component 114. In various aspects, the node property component 114 can store, maintain, and/or otherwise access (e.g., without storing and/or maintaining) an execution data structure. In various aspects, the execution data structure can list and/or indicate the execution properties of each of the N nodes of the computing service 106. In various cases, the executable data structure can be a matrix, table, chart, and/or relational database. In various other cases, the executable data structure can be a graph database. In various instances, the executable data structure can be any other suitable data structure that can store information pertaining to the N nodes of the computing service 106. In various aspects, the execution properties of a node can include an identifier and/or name of the node, can include a sub-function and/or sub-operation facilitated and/or performed by the node, can include whether the node operates synchronously and/or asynchronously (e.g., in series or in parallel), can include whether the node is mandatory or optional for the computing service 106 (e.g., whether the node is required and/or necessary for the computing service 106 to operate), and/or can include an execution time associated with the node (e.g., an amount of processing and/or computation time that is required to execute the node). In various cases, for any node that is a member of a multi-level-of-execution subset, the execution properties can include a level of resource utilization, decision quality, decision completeness, decision confidence, and/or decision accuracy associated with the node (e.g., complete and/or full resource utilization and/or confidence, intermediate resource utilization and/or confidence, lite resource utilization and/or confidence, ultra-lite resource utilization and/or confidence). In various aspects, a node that is a member of a multi-level-of-execution subset can be marked as optional in the execution data structure (e.g., that node is not the only one that can perform its particular sub-function). In various aspects, a node that is not a member of a multi-level-of-execution subset can be marked as mandatory in the execution data structure (e.g., no other node in the N nodes can perform that particular sub-function). In some cases, however, even a node that is not a member of a multi-level-of-execution subset can be marked as optional (e.g., such a node would represent a sub-function of the computing service 106 that can be wholly omitted from the computing service 106).

In various embodiments, the on-the-fly DAG reorganization system 102 can comprise a node identification component 116. In various aspects, the node identification component 116 can analyze the execution data structure stored, maintained, and/or accessed by the node property component 114 and can analyze the requested response time threshold and/or requested response quality threshold received by the input component 112. Based on this analysis, the node identification component 116 can identify/determine a set of nodes from the N nodes of the computing service 106 with which to build and/or construct an executable DAG (e.g., an executable workflow of nodes) corresponding to the computing service 106. In various aspects, the executable DAG can be considered as a version and/or instance and/or configuration of the computing service 106 that is tailored to satisfy the SLA specified by the computing client 104. In some cases, the executable DAG can represent a set and/or arrangement of nodes of the computing service 106, which set and/or arrangement of nodes can be executed by the computing service 106 to satisfy the SLA specified by the computing client 104 (e.g., nodes of the computing service 106 that are not included or listed in the executable DAG can be considered as not needed to satisfy the SLA specified by the computing client 104). In some cases, the executable DAG can be considered as an execution instruction generated by the on-the-fly DAG reorganization system 102, which execution instruction can be received by the computing service 106, and which execution instruction can identify for the computing service 106 those nodes that the computing service 106 should execute in order to satisfy the SLA specified by the computing client 104 (e.g., the computing service 106 can fulfill the specified SLA by executing those nodes identified in the executable DAG in an order and/or arrangement indicated by the executable DAG, and the computing service 106 can refrain from executing nodes that are not indicated and/or identified by the executable DAG). Thus, in various aspects, the executable DAG can be considered as an arrangement of nodes which the computing service 106 should execute in order to integrate with the computing client 104. Thus, in various cases, the executable DAG can be considered as a part of, version of, and/or configuration of the computing service 106.

In various aspects, the node identification component 116 can, in some cases, choose which of the N nodes of the computing service 106 to execute such that the computing service 106 satisfies the requested response time and/or the requested response quality specified by the computing client 104. In various instances, the identified/determined set of nodes can comprise one node for each sub-function and/or sub-operation associated with the computing service. Moreover, in various instances, the identified/determined set of nodes can comprise one node from each multi-level-of-execution subset of nodes. In some cases, the number of unique sub-functions and/or sub-operations associated with the computing service can be less the number of nodes in the computing service 106. In some cases, the number of multi-level-of-execution subsets of nodes can be less than and/or equal to the number of unique sub-functions and/or sub-operations associated with the computing service 106. For instance, the computing service 106 can have F different sub-functions and/or sub-operations, where $1 < F < N$. Moreover, the computing service 106 can have M different multi-level-of-execution subsets of nodes, where $1 \leq M \leq F$. In various aspects, the node identification component 116 can identify/determine F different nodes from the N total nodes in the computing service 106 (e.g., can identify/determine one node for each of the F different sub-operations and/or sub-functions). In various aspects, M nodes in the F identified/determined nodes can come from the M multi-level-of-execution subsets (e.g., one node can be identified/determined/selected/chosen from each of the M multi-level-of-execution subsets). In some cases, the node identification component 116 can identify/determine fewer than F nodes from the N total nodes in the computing service 106, such as when one or more sub-functions of the computing service 106 can be wholly omitted. In various aspects, the node identification component 116 can choose the identified/determined set of nodes such that the execution properties of the identified/determined set (e.g., as listed in the execution data structure) collectively satisfy the requested response time and/or the requested response quality received by the input component 112. In various instances, the node identification component 116 can construct and/or build an executable DAG using the identified/determined set of nodes (e.g., can order the identified/determined nodes in any suitable arrangement and/or workflow so that the identified/determined nodes execute in series and/or in parallel to provide the overall functionality of the computing service 106). Once constructed and/or built, the executable DAG can be received by the computing service 106, and the computing service 106 can implement the executable DAG to facilitate integration and/or interaction with the computing client 104 (e.g., the computing service 106 can satisfy the requested response time and/or the requested response quality of the computing client 104 by executing the nodes identified in the executable DAG and by not executing the nodes not identified in the executable DAG).

In various aspects, by leveraging the one or more multi-level-of-execution subsets (e.g., by identifying/determining/selecting/choosing different nodes having different levels of resource utilization, quality, completeness, confidence, and/or accuracy), the node identification component 116 can create different executable DAGs, and thus different versions and/or instances of the computing service 106, that are automatically tailored to the SLA requirements specified by the computing client 104.

Figure 2:
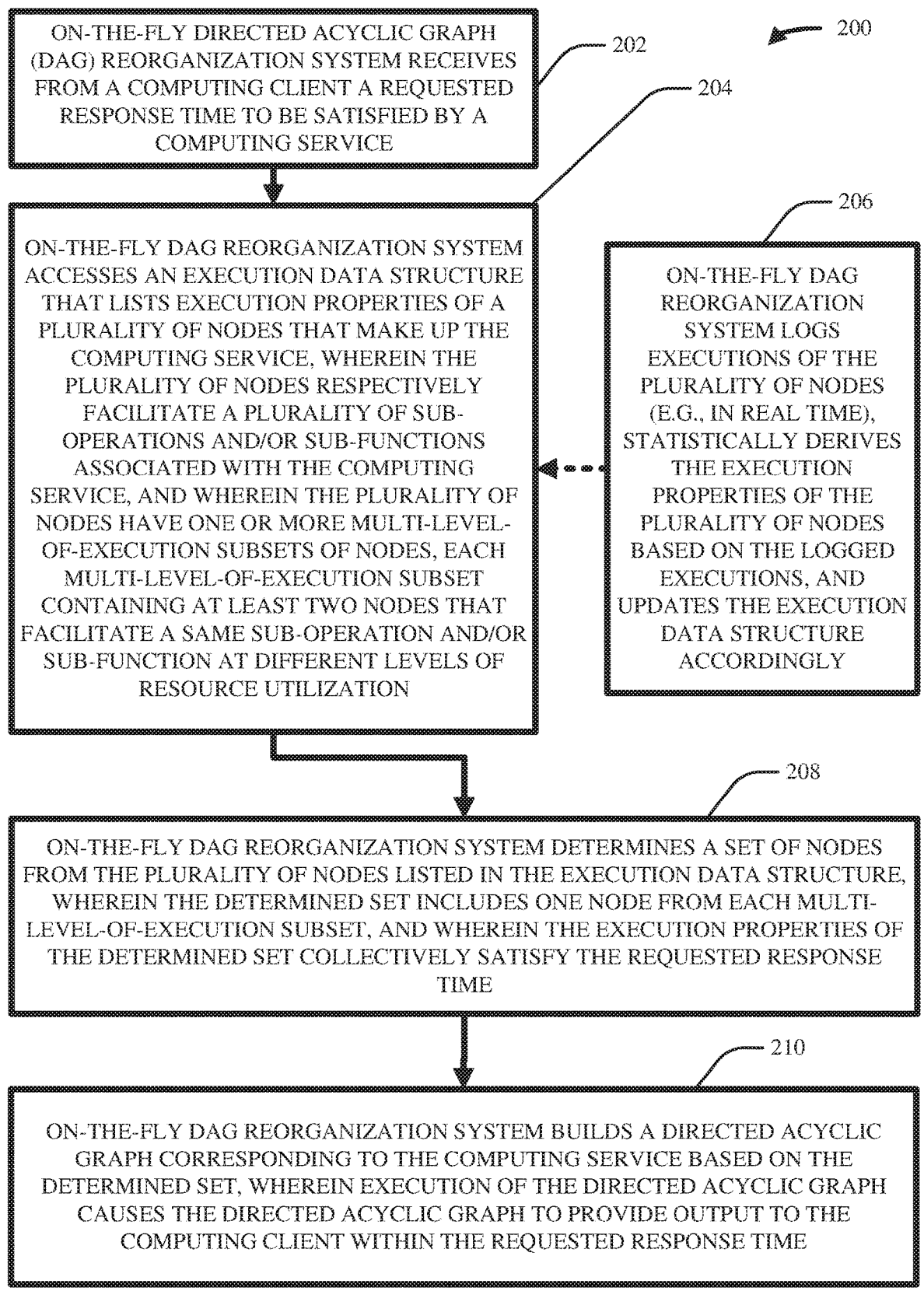
FIG. 2 illustrates a high-level flow diagram of an example, non-limiting computer-implemented method that facilitates on-the-fly reorganization of directed acyclic graph nodes of a computing service in accordance with one or more embodiments described herein.

FIG. 2 illustrates a high-level flow diagram of an example, non-limiting computer-implemented method 200 that can facilitate on-the-fly reorganization of directed acyclic graph nodes of a computing service in accordance with one or more embodiments described herein. In various aspects, the computer-implemented method 200 can be facilitated by the system 100.

In various embodiments, in act 202, an on-the-fly directed acyclic graph (DAG) reorganization system (e.g., 102) can receive (e.g., via 112) from a computing client (e.g., 104) a requested response time to be satisfied by a computing service (e.g., 106).

In various embodiments, in act 204, the on-the-fly DAG reorganization system can access (e.g., via 114) an execution data structure that lists execution properties of a plurality of nodes (e.g., the N total nodes) that make up the computing service. In various cases, the plurality of nodes can respectively facilitate a plurality of sub-operations and/or sub-functions (e.g., the F unique sub-functions) associated with the computing service. In various aspects, the plurality of nodes can have one or more multi-level-of-execution subsets of nodes (e.g., the M multi-level-of-execution subsets). In various aspects, each multi-level-of-execution subset can contain at least two nodes that independently facilitate a same sub-operation and/or sub-function at different levels of resource utilization (e.g., different levels of accuracy/confidence/quality and/or different processing times).

In various embodiments, in act 206, the on-the-fly DAG reorganization system can log executions of the plurality of nodes (e.g., can log executions in real-time and/or over any suitable length of time). In various aspects, the on-the-fly DAG reorganization system can statistically derive the execution properties of the plurality of nodes based on the logged executions. In various instances, the on-the-fly DAG reorganization system can update the execution data structure accordingly (e.g., input into the execution data structure the newly derived execution properties of the plurality of nodes).

In various embodiments, in act 208, the on-the-fly DAG reorganization system can determine (e.g., via 116) a set of nodes (e.g., containing F and/or fewer than F nodes) from the plurality of nodes listed in the execution data structure. In various aspects, the determined set can include one node from each multi-level-of-execution subset. In various instances, the execution properties of the determined set can collectively satisfy the requested response time.

In various embodiments, in act 210, the on-the-fly DAG reorganization system can build a directed acyclic graph (DAG) corresponding to the computing service based on the determined set (e.g., can build a version and/or instance of the computing service 106 by arranging the determined nodes into a suitable workflow). In various aspects, execution of the constructed DAG can cause the constructed DAG to provide output to the computing client within the requested response time.

Figure 3:
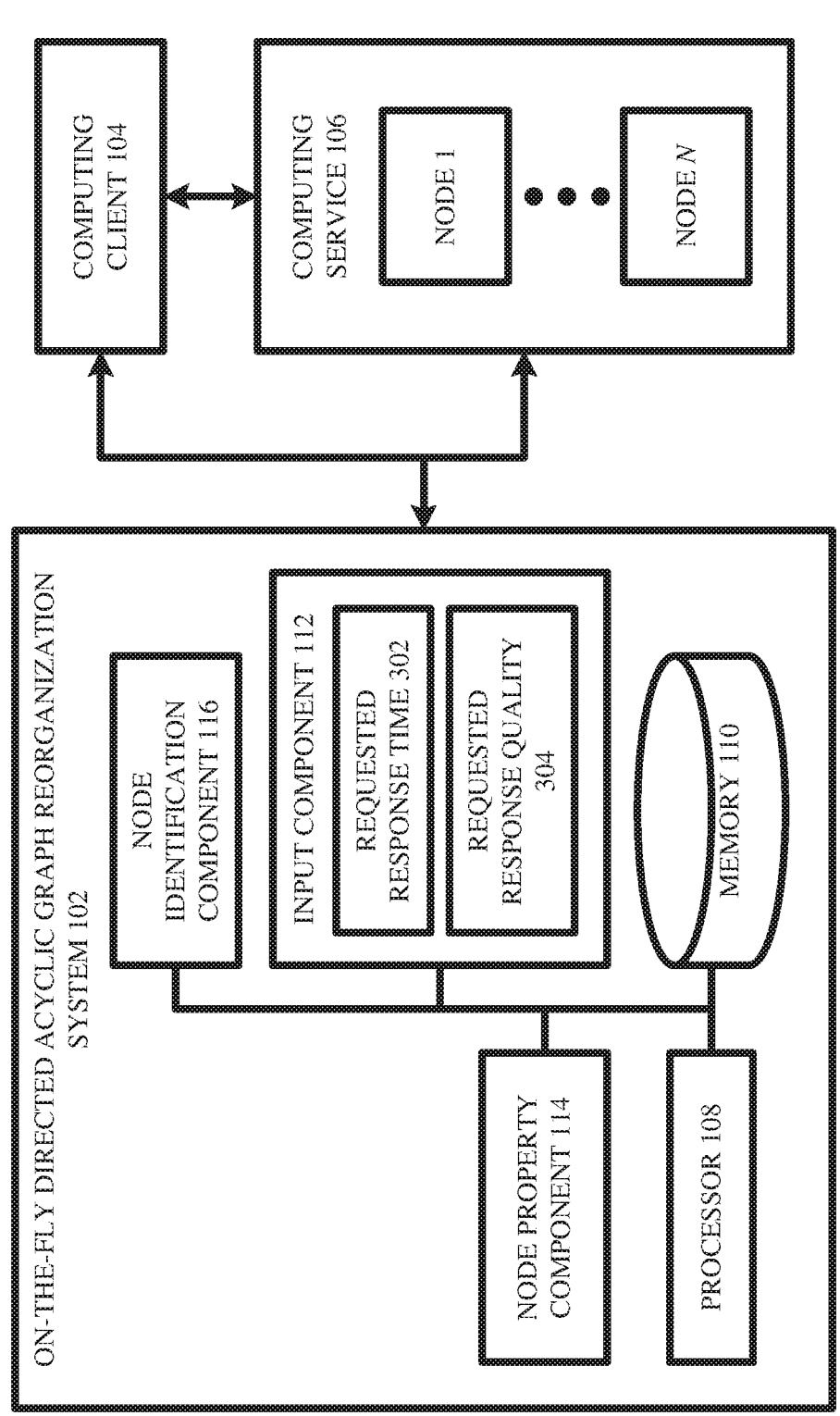
FIG. 3 illustrates a high-level block diagram of an example, non-limiting system including a requested response time and a requested response quality that facilitates on-the-fly reorganization of directed acyclic graph nodes of a computing service in accordance with one or more embodiments described herein.

FIG. 3 illustrates a high-level block diagram of an example, non-limiting system 300 including a requested response time and a requested response quality that can facilitate on-the-fly reorganization of directed acyclic graph nodes of a computing service in accordance with one or more embodiments described herein. In various aspects, the system 300 can comprise the same components as the system 100, and can further comprise a requested response time 302 and/or a requested response quality 304.

In various aspects, the input component 112 can receive from the computing client 104 a requested response time 302. In various aspects, the input component 112 can also receive from the computing client 104 a requested response quality 304. In various cases, however, the requested response quality 304 can be optional (e.g., in some instances, the input component 112 receives the requested response time 302 and does not receive the requested response quality 304). In various instances, the requested response time 302 can be a processing and/or execution threshold that the computing client 104 desires to be satisfied and/or met by the computing service 106. More specifically, the requested response time 302 can, in some cases, be a maximum amount of processing and/or execution time which the computing client 104 is willing to accept from the computing service 106. To facilitate integration between the computing client 104 and the computing service 106, some version of the computing service 106 will have to be able to provide responses to the computing client 104 without exceeding the requested response time 302. In various instances, the requested response quality 304 can be an accuracy, confidence, quality, and/or completeness threshold that the computing client 104 desires to be satisfied and/or met by the computing service 106. More specifically, the requested response quality 304 can, in some cases, be a minimum level of accuracy, a minimum level of completeness, a minimum level of quality, a minimum level of confidence, and/or a minimum level of resource utilization which the computing client 104 is willing to accept from the computing service 106. In embodiments where the requested response quality 304 is received by the input component 112, in order to facilitate integration between the computing client 104 and the computing service 106, some version of the computing service 106 will have to be able to provide responses to the computing client 104 at least at the accuracy, completeness, quality, confidence, and/or resource utilization level corresponding to the requested response quality 304. In various aspects, if both the requested response time 302 and the requested response quality 304 are received by the input component 112, the computing service 106 will have to be able to satisfy both the requested response time 302 and the requested response quality 304 in order to facilitate integration between the computing service 106 and the computing client 104.

Figure 4:
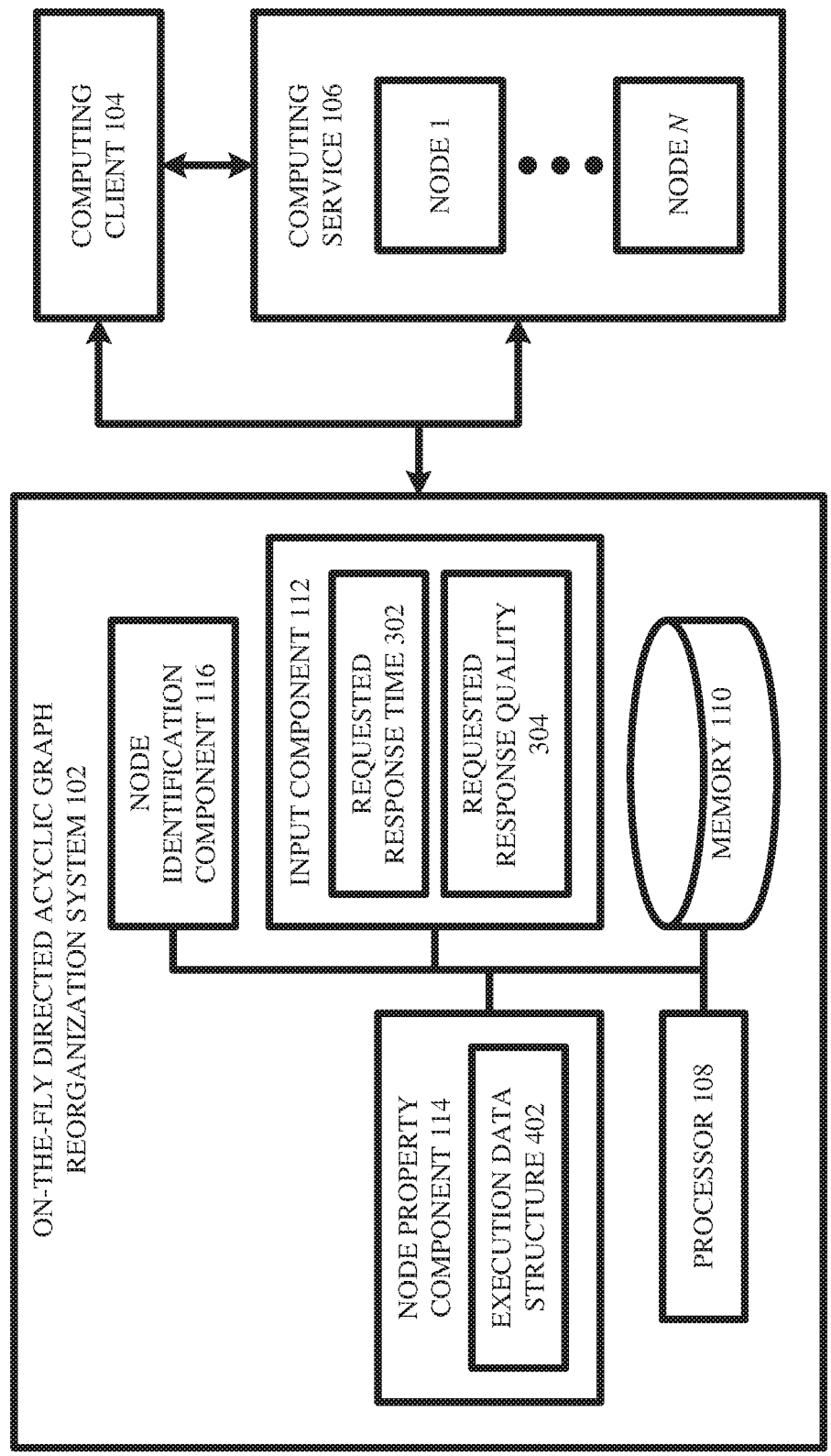
FIG. 4 illustrates a high-level block diagram of an example, non-limiting system including an execution data structure that facilitates on-the-fly reorganization of directed acyclic graph nodes of a computing service in accordance with one or more embodiments described herein.

FIG. 4 illustrates a high-level block diagram of an example, non-limiting system 400 including an execution data structure that can facilitate on-the-fly reorganization of directed acyclic graph nodes of a computing service in accordance with one or more embodiments described herein. In various aspects, the system 400 can comprise the same components as the system 300, and can further comprise the execution data structure 402.

In various instances, the node property component 114 can electronically store, electronically maintain, and/or otherwise electronically access the execution data structure 402. In various aspects, the execution data structure 402 can list execution properties of the N nodes of the computing service 106. In various instances, for each node, the execution properties can include an identifier (e.g., alphanumeric) of the node, can include an indication and/or description of a sub-function facilitated by the node, can include whether the node is mandatory and/or optional for the computing service 106, can include whether the node can execute synchronously and/or asynchronously, and/or can include an execution time (e.g., measured in milliseconds) of the node. In various aspects, for each node that is a member of a multi-level-of-execution subset, the execution properties can further include a level of resource utilization (e.g., level of quality, accuracy, confidence, and/or completeness) of the node. In various instances, any other suitable node properties can be listed and/or included in the execution data structure 402. In various aspects, the execution data structure 402 can take any suitable computing form. In some cases, the execution data structure 402 can be a matrix, chart, table, and/or relational database. In some cases, the execution data structure 402 can be a graph database. In various instances, the on-the-fly DAG reorganization system 102 can leverage the execution data structure 402 in order to build and/or construct a version of the computing service 106 that satisfies the requested response time 302 and/or the requested response quality 304.

Although FIG. 4 depicts the execution data structure 402 as being stored within the node property component 114, this is non-limiting and for illustration only. In various aspects, the execution data structure 402 can be stored in any suitable location remote from the node property component 114, and the node property component 114 can remotely access the execution data structure 402.

FIG. 5 illustrates a high-level block diagram of an example, non-limiting execution data structure that can facilitate on-the-fly reorganization of directed acyclic graph nodes of a computing service in accordance with one or more embodiments described herein. As shown, FIG. 5 depicts an exemplary, non-limiting execution matrix 500. In various aspects, the execution matrix 500 can be an instantiation and/or example of the execution data structure 402.

In various embodiments, as shown, the execution matrix 500 can list various execution properties of various nodes that make up the computing service 106. In the illustrated example, only ten nodes are illustrated in the execution matrix 500 (e.g., nodes 1-10). This is non-limiting and for illustration only. In various aspects, any suitable number of nodes can be listed in the execution matrix 500 (e.g., all N nodes of the computing service 106 can be listed in the execution matrix 500).

As shown, the execution properties listed in the execution matrix 500 can include identifiers of the nodes (e.g. "NODE IDENTIFIER"), can include sub-functions and/or sub-operations facilitated and/or performed by the nodes (e.g., "FUNCTION"), can include whether a node is mandatory and/or optional (e.g., "MANDATORY vs. OPTIONAL"), can include whether a node is synchronous and/or asynchronous (e.g., "SYNCHRONOUS vs. ASYNCHRONOUS"), and/or can include an execution, processing, and/or computation time of a node (e.g., "EXECUTION TIME (ms)"). In various aspects, the execution properties listed in the execution matrix 500 can also include a level of resource utilization for various nodes (e.g., "RESOURCE UTILIZATION"). In various aspects, a level of resource utilization can be listed for nodes that are members of a multi-level-of-execution subset, and can be not listed for nodes that are not members of a multi-level-of-execution subset. However, in some cases, a level of resource utilization can nevertheless be listed even for nodes that are not members of a multi-level-of-execution subset.

As shown, the node 1 can perform request validation, can have an unspecified level of resource utilization, can be mandatory, can execute only synchronously, and can have a processing time of about 20 ms. As shown, the node 2 can perform request conversion, can have an unspecified level of resource utilization, can be mandatory, can execute either synchronously and/or asynchronously, and can have a processing time of about 50 ms. As shown, the node 3 can perform data loading, can have a lite level of resource utilization, can be optional, can execute synchronously, and can have a processing time of about 200 ms. And so on.

As shown, the node 3 and the node 4 can each independently perform data loading. Thus, the node 3 and the node 4 together can be considered as a multi-level-of-execution subset that corresponds to the sub-function of data loading. As shown, the node 3 and the node 4 can have different levels of resource utilization (e.g., lite vs. complete). Also as shown, the node 3 and the node 4 can have different processing times (e.g., 200 ms vs. 400 ms), due to the difference in levels of resource utilization. In other words, the node 3 can perform data loading more quickly but less accurately and/or less completely and/or with less confidence than the node 4. Similarly, the node 5, the node 6, and the node 7 can each independently perform rule execution. Thus, the node 5, the node 6, and the node 7 together can be considered as a multi-level-of-execution subset that corresponds to the sub-function of rule execution. As shown, the node 5, the node 6, and the node 7 can have different levels of resource utilization (e.g., ultra-lite vs. lite vs. complete). Also as shown, the node 5, the node 6, and the node 7 can have different processing times (e.g., 50 ms vs. 100 ms vs. 200 ms), due to the differences in levels of resource utilization. In other words, the node 5 can perform rule execution more quickly but less accurately and/or less completely and/or less confidently than the node 6, and the node 6 can perform rule execution more quickly but less accurately and/or less completely and/or less confidently than the node 7.

As explained herein, these multi-level-of-execution subsets can be leveraged by the on-the-fly DAG reorganization system 102 in order to construct a version of the computing service 106 that satisfies the requested response time 302 and/or the requested response quality 304 received by the input component 112. Specifically, in various cases, if the requested response time 302 is sufficiently long and thus offers a generous amount of time to the computing service 106, then nodes having higher levels of resource utilization can be identified, determined, selected, chosen, and/or implemented. In various cases, if the requested response time 302 is not very long and thus offers a less generous amount of time to the computing service 106, then nodes having lower levels of resource utilization can be identified, determined, selected, chosen, and/or implemented.

In various aspects, as mentioned above, the execution matrix 500 can omit indicating a level of resource utilization for a node that is not a member of a multi-level-of-execution subset. This is because such a node can be the only node in the entire N total nodes that can perform its particular sub-function. In other words, there can be no need to specify a level of resource utilization when there is only a single choice of node for a particular sub-function of the computing service 106. However, in some cases, a level of resource utilization can nevertheless be indicated even for nodes that are not members of a multi-level-of-execution subset.

Figure 6:
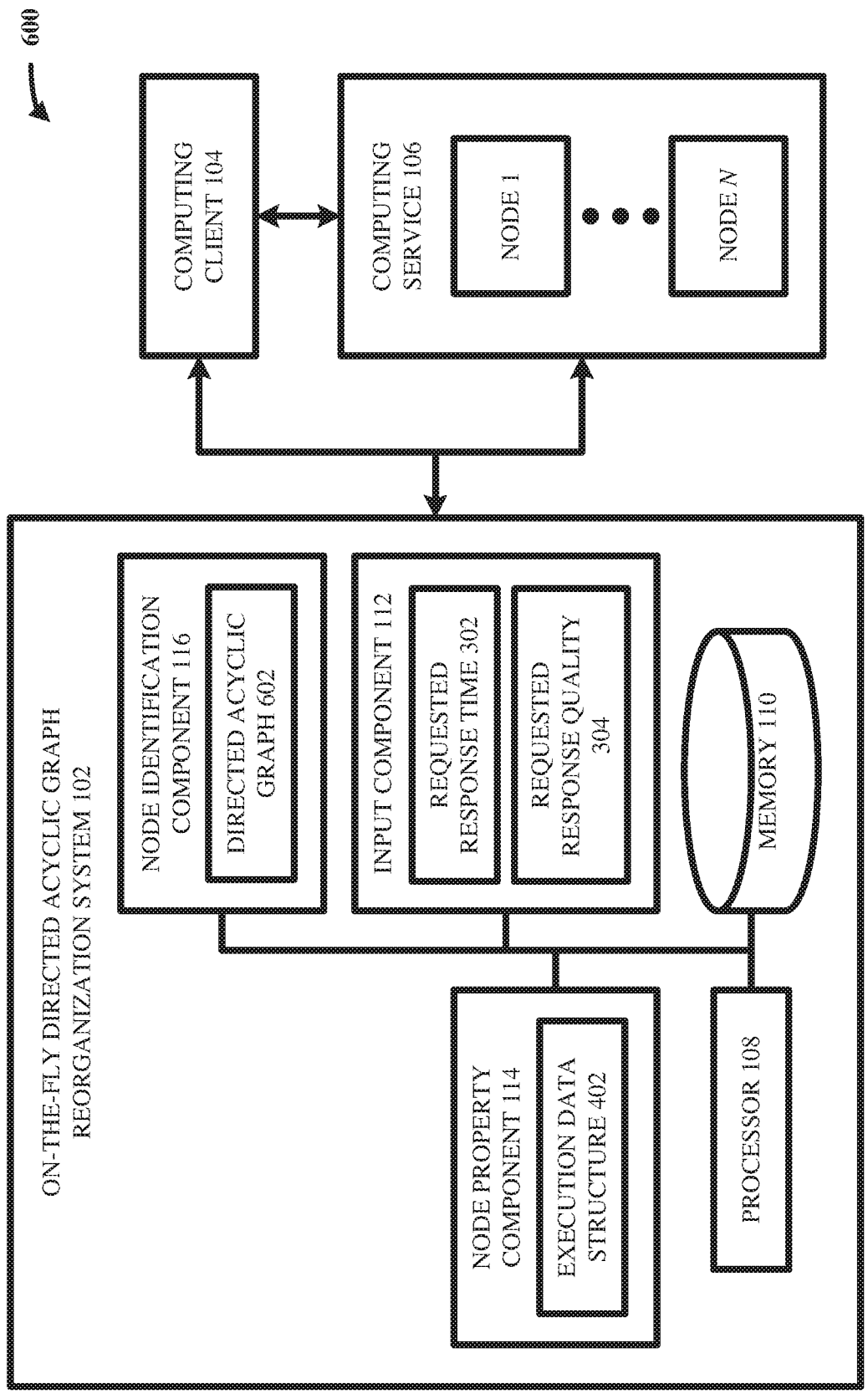
FIG. 6 illustrates a high-level block diagram of an example, non-limiting system including a directed acyclic graph that facilitates on-the-fly reorganization of directed acyclic graph nodes of a computing service in accordance with one or more embodiments described herein.

FIG. 6 illustrates a high-level block diagram of an example, non-limiting system 600 including a directed acyclic graph that can facilitate on-the-fly reorganization of directed acyclic graph nodes of a computing service in accordance with one or more embodiments described herein. In various aspects, the system 600 can comprise the same components as the system 400, and can further comprise a directed acyclic graph 602 (e.g., DAG 602).

In various embodiments, the node identification component 116 can analyze the requested response time 302, the requested response quality 304, and/or the execution data structure 402. Based on this analysis, the node identification component 116 can identify/determine a set of nodes from the N total nodes of the computing service 106 such that the execution properties (e.g., listed in the execution data structure 402) of the identified/determined set collectively satisfy the requested response time 302 and/or the requested response quality 304. In various cases, the identified/determined set can include one node from each multi-level-of-execution subset. In some cases, the node identification component 116 can identify/determine nodes from the N total nodes of the computing service 106 based on a load distribution among the N total nodes (e.g., based on load balancing concerns). In such case, the node identification component 116 can have a preference for identifying, determining, selecting, and/or choosing nodes that are currently not near and/or above their total load capacity, and the node identification component 116 can prefer to not identify, determine, select, and/or choose nodes that are currently near and/or above their total load capacity. In various aspects, the node identification component 116 can then build and/or construct the DAG 602 from the identified/determined set of nodes. That is, in various cases, the node identification component 116 can chain and/or link together the identified/determined set of nodes into any suitable graph structure and/or workflow structure, which can include parallel and/or serial connections between the identified/determined nodes as needed and/or as required by the execution properties of the identified/determined set of nodes. In various aspects, this generated graph structure and/or workflow structure can be considered the DAG 602. In various cases, as mentioned above, the DAG 602 can be considered as an indication and/or instruction that is generated by the on-the-fly DAG reorganization system 102, which indication and/or instruction can be received and/or accessed by the computing service 106, and which indication and/or instruction can identify for the computing service 106 those nodes (e.g., the identified/determined set) that should be executed to satisfy the requested response time 302 and/or the requested response quality 304 (e.g., the computing service 106 can satisfy the requested response time 302 and/or the requested response quality 304 by executing the nodes identified by the DAG 602 in the arrangement indicated by the DAG 602). In various aspects, since the execution properties of the identified/determined set of nodes can satisfy the requested response time 302 and/or the requested response quality 304, and because the DAG 602 can be constructed from the identified/determined set of nodes, implementation of the DAG 602 by the computing service 106 can satisfy the requested response time 302 and/or the requested response quality 304. In various aspects, the DAG 602 can include (e.g., can be built from) nodes in the identified/determined set of nodes, and can exclude nodes that are not in the identified/determined set of nodes.

Although FIG. 6 illustrates only one DAG 602 being constructed and/or built by the node identification component 116, this is non-limiting and for illustration only. In various aspects, the node identification component 116 can construct and/or build any suitable number of DAGs 602.

Overall, as shown above, various embodiments of the subject innovation can receive as input the requested response time 302, the requested response quality 304, and/or the execution data structure 402, and can generate as output the DAG 602. In various aspects, the DAG 602 can be considered as an executable version and/or instance of the computing service 106 (e.g., with the DAG 602 containing fewer than N nodes) that satisfies the requested response time 302 and/or the requested response quality 304 (e.g., that satisfies the SLA specified by the computing client 104). In some cases, the DAG 602 can be considered as an execution instruction that identifies which nodes that the computing service 106 should execute in order to integrate with the computing client 104 (e.g., the computing service 106 can receive the execution instruction and can execute the nodes identified in the execution instruction, thereby facilitating integration with the computing client 104). In other words, the on-the-fly DAG reorganization system 102 can automatically create a version and/or instance of the computing service 106 that is tailored to integrate with the computing client 104. In still other words, if an existing version and/or instance of the computing service 106 does not satisfy a specified SLA of the computing client 104, the on-the-fly DAG reorganization system 102 can automatically generate another version and/or instance of the computing service 106 that does satisfy the specified SLA of the computing client 104. Such a result is clearly a useful and practical application of computers. Indeed, conventional systems and/or techniques could not facilitate such a result without extensive and manual reprogramming of the computing service 106. That is, various embodiments of the subject innovation can facilitate integration between the computing client 104 and the computing service 106 when conventional systems and/or techniques could not facilitate such integration without an inordinate amount of manual recoding. Thus, various embodiments of the subject innovation can improve a level of integration flexibility of the computing service 106 (e.g., improving the performance of a computer, allowing a computer to do something which it was previously incapable of doing). For at least these reasons, various embodiments of the subject innovation constitute a concrete and technical improvement in the field of service-oriented architectures.

Figure 7:
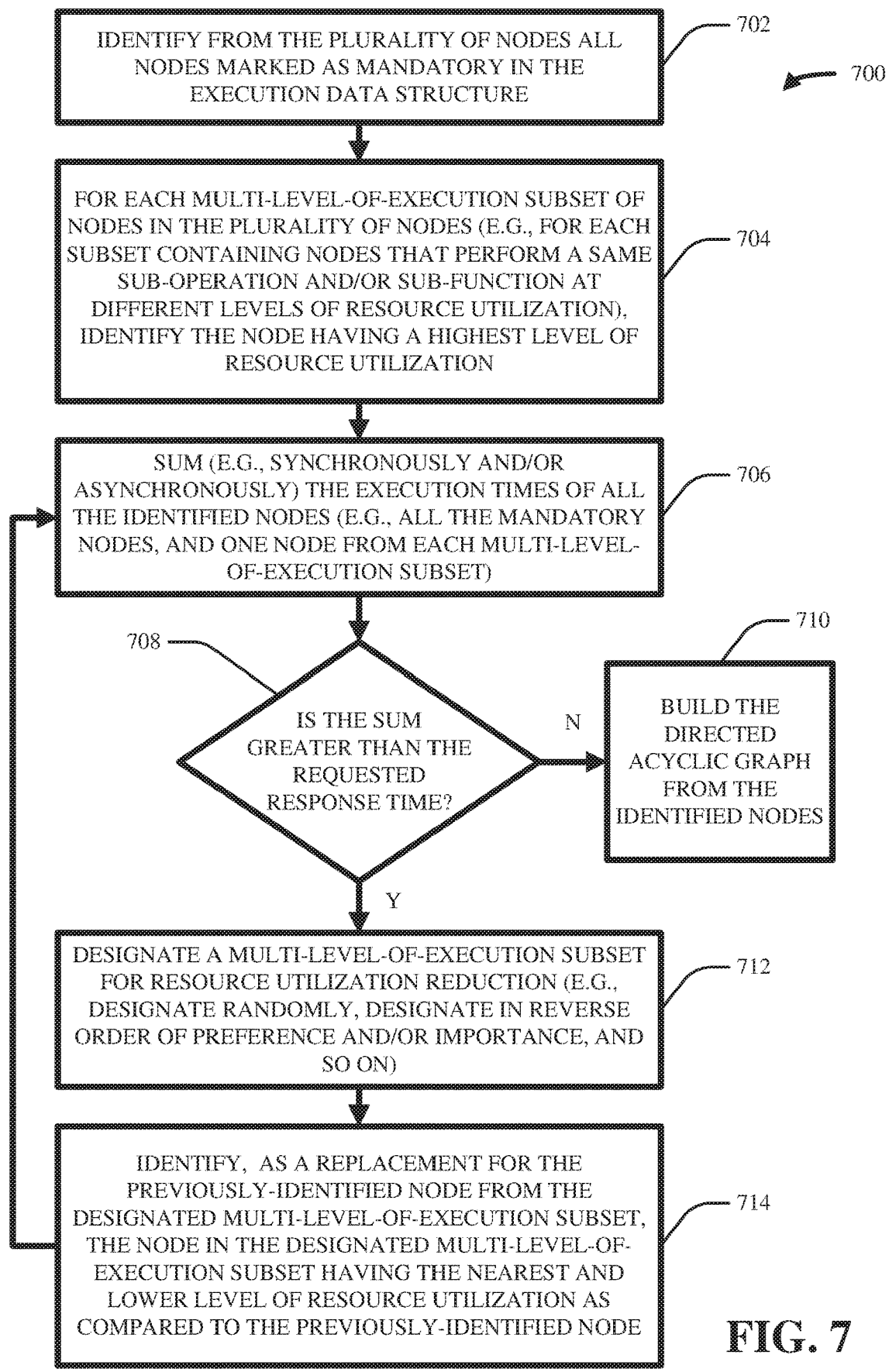
FIG. 7 illustrates a high-level flow diagram of an example, non-limiting computer-implemented method that facilitates identification/determination of nodes listed in an execution data structure for on-the-fly reorganization of directed acyclic graph nodes of a computing service in accordance with one or more embodiments described herein.

FIG. 7 illustrates a high-level flow diagram of an example, non-limiting computer-implemented method 700 that can facilitate identification/determination of nodes listed in an execution data structure for on-the-fly reorganization of directed acyclic graph nodes of a computing service in accordance with one or more embodiments described herein. In various aspects, the computer-implemented method 700 can be considered as a non-limiting, exemplary algorithm that can be implemented by the node identification component 116 in order to choose the identified/determined set of nodes from the N total nodes of the computing service 106.

In various embodiments, act 702 can include identifying, by a device operatively coupled to a processor, from the plurality of nodes (e.g., the N total nodes) all nodes marked as mandatory in the execution data structure (e.g., 402).

In various embodiments, act 704 can include, for each multi-level-of-execution subset of nodes in the plurality of nodes (e.g., for each subset containing nodes that independently perform a same sub-operation and/or sub-function at different levels of resource utilization, quality, confidence, accuracy, and/or completeness), identifying, by the device, the node having a highest level of resource utilization (e.g., highest quality, confidence, accuracy, and/or completeness).

In various embodiments, act 706 can include summing (e.g., while taking into account synchronous and/or asynchronous execution of the identified nodes), by the device, the execution times of all the identified nodes (e.g., where the identified nodes can include all the mandatory nodes and one node from each multi-level-of-execution subset).

In various embodiments, act 708 can include determining, by the device, whether the sum of the execution times of the identified nodes is greater than the requested response time. If not, the computer-implemented method 700 can proceed to the act 710. If so, the computer-implemented method 700 can proceed to the act 712.

In various embodiments, act 710 can include building, by the device, the directed acyclic graph (e.g., 602) from the identified nodes.

In various embodiments, act 712 can include designating, by the device, a multi-level-of-execution subset for resource utilization reduction (e.g., designate randomly, designate in reverse order of preference and/or importance).

In various embodiments, act 714 can include identifying, by the device and as a replacement for the previously-identified node from the designated multi-level-of-execution subset, the node in the designated multi-level-of-execution subset having the nearest and lower level of resource utilization (e.g., nearest and lower quality, accuracy, confidence, and/or completeness) as compared to the previously-identified node from the designated multi-level-of-execution subset. In various aspects, the computer-implemented method 700 can then proceed back to act 706.

In other words, acts 712 and 714 can involve choosing (e.g., designating) one of the multi-level-of-execution subsets in which to change the node that was identified from that multi-level-of-execution subset at act 704 (e.g., and/or possibly at act 714 if more than one iteration has been performed). In various aspects, this re-identification can be necessary because the sum of the execution times is greater than the requested response time, which can indicate that at least one node with a lower level of resource utilization (e.g., lower level of quality, accuracy, confidence, and/or completeness) should be identified as a substitute for an already-identified node having a higher level of resource utilization. In various aspects, such designation of a multi-level-of-execution subset can be performed randomly (e.g., randomly choosing one of the one or more multi-level-of-execution subsets), and/or can be performed according to an order and/or reverse order of preference and/or importance. For example, a least preferential and/or least important multi-level-of-execution subset (e.g., corresponding to a least preferential and/or least important sub-operation) can be designated first for resource utilization reduction. Once the node having the lowest level of resource utilization in the least preferential and/or least important multi-level-of-execution subset is identified (e.g., which can require multiple iterations of re-identification, and/or multiple iterations through acts 706-708-712-714), a second least preferential and/or second least important multi-level-of-execution subset can be designated next for resource utilization reduction. In various aspects, each iteration of resource utilization reduction can change the identified set of nodes and can therefore reduce an overall and/or collective amount of processing time required by the identified set of nodes (e.g., can reduce the sum calculated in act 706). Once the overall and/or collective amount of the processing time required by the identified set of nodes is less than and/or equal to the requested response time, the identified set of nodes can be used to build and/or construct the directed acyclic graph (e.g., to build and/or construct a version of the computing service 106 that can satisfy the SLA specified by the computing client 104).

In various embodiments, the node identification component 116 can employ any suitable machine learning classifier and/or machine learning algorithm for identifying/determining nodes from the N total nodes of the computing service 106. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 8:
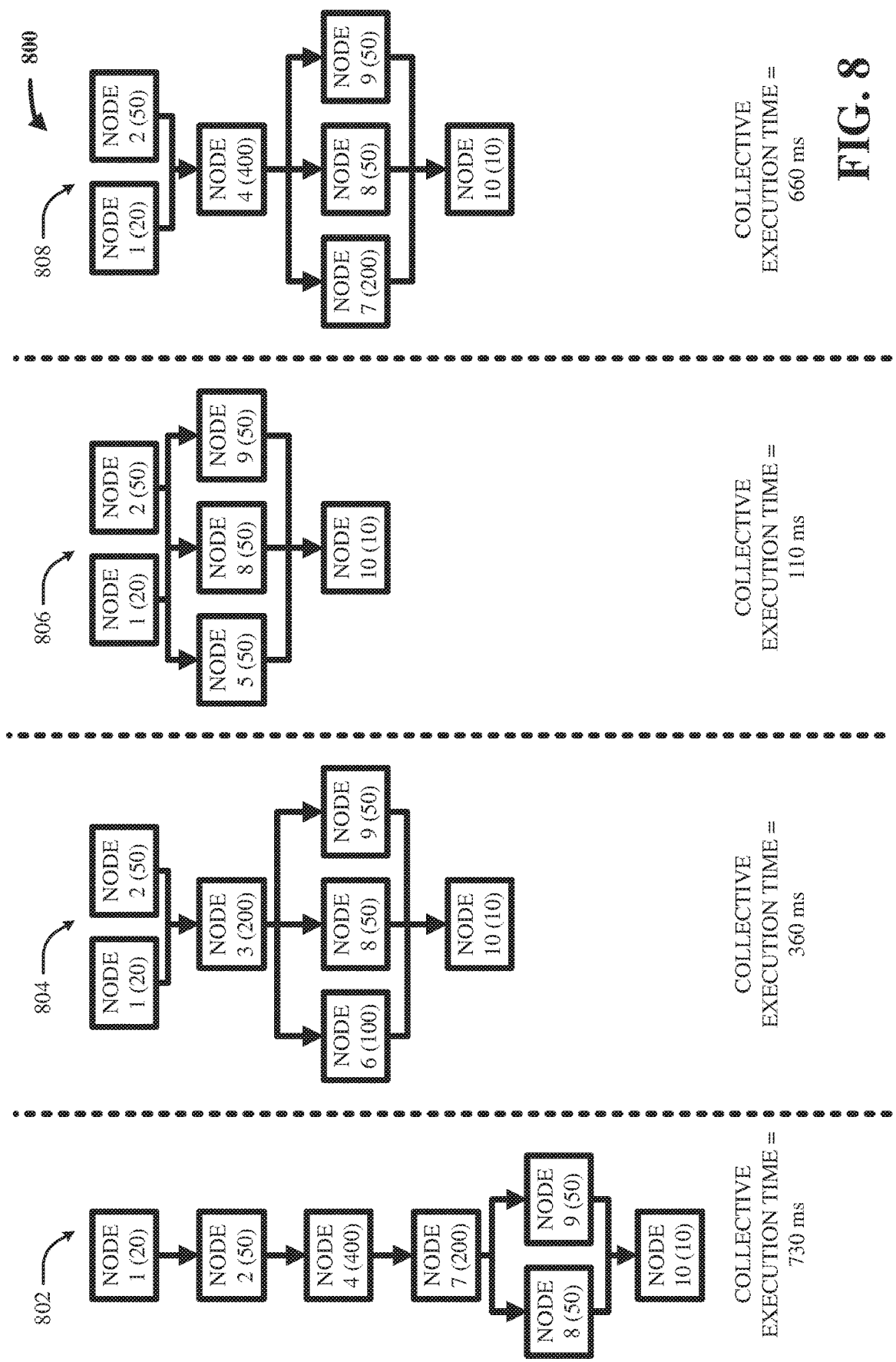
FIG. 8 illustrates example, non-limiting directed acyclic graphs corresponding to a computing service in accordance with one or more embodiments described herein.

FIG. 8 illustrates example, non-limiting directed acyclic graphs 800 (e.g., DAGs 800) corresponding to a computing service in accordance with one or more embodiments described herein. In various aspects, the DAGs 800 can be non-limiting examples of the DAG 602 that are constructed based on the execution matrix 500. Specifically, as shown, the execution matrix 500 can be leveraged to construct the DAG 802, the DAG 804, the DAG 806, and the DAG 808. In various aspects, the DAG 802, the DAG 804, the DAG 806, and the DAG 808 can each be considered as a different workflow and/or different version/instance of the computing service 106, each having a different overall level of resource utilization, quality, accuracy, confidence, and/or completeness. Thus, in various aspects, the DAG 802, the DAG 804, the DAG 806, and the DAG 808 can each facilitate the same overall function and/or overall operation, but each can execute in a different amount of execution/processing time and/or with a different level of accuracy, confidence, quality, and/or completeness.

As shown, the DAG 802 can be constructed by the node identification component 116 in various cases. In various aspects, the node identification component 116 can identify/determine from the execution matrix 500 all nodes marked as mandatory (e.g., nodes 1, 2, 8, 9, and 10) and can identify/determine from each multi-level-of-execution subset a node having a corresponding level of resource utilization (e.g., node 4 from the multi-level-of-execution subset corresponding to the sub-function of data loading, and node 7 from the multi-level-of-execution subset corresponding to the sub-function of rule execution). In various aspects, as indicated in the execution matrix 500, the node 1 can execute synchronously with a processing time of 20 ms, the node 2 can execute synchronously (and/or asynchronously in some cases) with a processing time of 50 ms, the node 4 can execute synchronously with a processing time of 400 ms, the node 7 can execute synchronously with a processing time of 200 ms, the node 8 can execute asynchronously (and/or synchronously in some cases) with a processing time of 50 ms, the node 9 can execute asynchronously (and/or synchronously in some cases) with a processing time of 50 ms, and the node 10 can execute synchronously with a processing time of 10 ms. As shown, the total execution time of the DAG 802 can be 730 ms (e.g., 20+50+400+200+max(50,50)+10=730).

As shown, the DAG 804 can be constructed by the node identification component 116 in various cases. In various aspects, the node identification component 116 can identify/determine from the execution matrix 500 all nodes marked as mandatory (e.g., nodes 1, 2, 8, 9, and 10) and can identify/determine from each multi-level-of-execution subset a node having a corresponding level of resource utilization (e.g., node 3 from the multi-level-of-execution subset corresponding to the sub-function of data loading, and node 6 from the multi-level-of-execution subset corresponding to the sub-function of rule execution). In various aspects, as indicated in the execution matrix 500, the node 1 can execute synchronously with a processing time of 20 ms, the node 2 can execute asynchronously (and/or synchronously in some cases) with a processing time of 50 ms, the node 3 can execute synchronously with a processing time of 200 ms, the node 6 can execute synchronously with a processing time of 100 ms, the node 8 can execute asynchronously (and/or synchronously in some cases) with a processing time of 50 ms, the node 9 can execute asynchronously (and/or synchronously in some cases) with a processing time of 50 ms, and the node 10 can execute synchronously with a processing time of 10 ms. As shown, the total execution time of the DAG 804 can be 360 ms (e.g., max(20,50)+200+max(100, 50, 50)+10=360).

As shown, the DAG 806 can be constructed by the node identification component 116 in various cases. In various aspects, the node identification component 116 can identify/determine from the execution matrix 500 all nodes marked as mandatory (e.g., nodes 1, 2, 8, 9, and 10) and can identify/determine from fewer than all multi-level-of-execution subsets a node having a corresponding level of resource utilization (e.g., no node identified/determined from the multi-level-of-execution subset corresponding to the sub-function of data loading, and node 5 identified/determined from the multi-level-of-execution subset corresponding to the sub-function of rule execution). In various aspects, as indicated in the execution matrix 500, the node 1 can execute synchronously with a processing time of 20 ms, the node 2 can execute asynchronously (and/or synchronously in some cases) with a processing time of 50 ms, the node 5 can execute synchronously with a processing time of 50 ms, the node 8 can execute asynchronously (and/or synchronously in some cases) with a processing time of 50 ms, the node 9 can execute asynchronously (and/or synchronously in some cases) with a processing time of 50 ms, and the node 10 can execute synchronously with a processing time of 10 ms. As shown, the total execution time of the DAG 806 can be 110 ms (e.g., max(20,50)+max(50, 50, 50)+10=110). In such case, the DAG 806 does not perform the sub-function of data loading (e.g., no data loading node was identified/determined).

As shown, the DAG 808 can be constructed by the node identification component 116 in various cases. In various aspects, the node identification component 116 can identify/determine from the execution matrix 500 all nodes marked as mandatory (e.g., nodes 1, 2, 8, 9, and 10) and can identify/determine from each multi-level-of-execution subset a node having a corresponding level of resource utilization (e.g., node 4 identified/determined from the multi-level-of-execution subset corresponding to the sub-function of data loading, and node 7 from the multi-level-of-execution subset corresponding to the sub-function of rule execution). In various aspects, as indicated in the execution matrix 500, the node 1 can execute synchronously with a processing time of 20 ms, the node 2 can execute asynchronously (and/or synchronously in some cases) with a processing time of 50 ms, the node 4 can execute synchronously with a processing time of 400 ms, the node 7 can execute synchronously with a processing time of 200 ms, the node 8 can execute asynchronously (and/or synchronously in some cases) with a processing time of 50 ms, the node 9 can execute asynchronously (and/or synchronously in some cases) with a processing time of 50 ms, and the node 10 can execute synchronously with a processing time of 10 ms. As shown, the total execution time of the DAG 808 can be 660 ms (e.g., max(20,50)+400+max(200, 50, 50)+10=660).

In various aspects, the DAG 806 can run more quickly but less accurately, confidently, and/or completely than the DAG 804. In various aspects, the DAG 804 can run more quickly but less accurately, confidently, and/or completely than the DAG 808. In various aspects, the DAG 808 can run more quickly and with comparable accuracy/completeness as the DAG 802 (e.g., the DAG 808 includes the same nodes as the DAG 802, but the node 2 is asynchronously implemented with the node 1, and the nodes 8 and 9 are asynchronously implemented with the node 7, which can save time). In various aspects, the DAG 808 can be considered as an optimized version of the DAG 802.

In various aspects, it can be said that the on-the-fly DAG reorganization system 102 can rearrange and/or reorganize the N nodes of the computing service 106 into the DAG 802, the DAG 804, the DAG 806, the DAG 808, and/or any other suitable DAG, based on the requested response time 302 (and/or based on the requested response quality 304). In other words, when given a requested response time 302 and/or a requested response quality 304, the on-the-fly DAG reorganization system 102 can generate a suitable DAG (e.g., by leveraging the execution data structure 402) that can satisfy the requested response time 302 and/or the requested response quality 304. For instance, if the requested response time is 750 ms and/or the requested response quality is high and/or complete, the on-the-fly DAG reorganization system 102 can generate the DAG 802 (e.g., 730 ms is less than and/or equal to 750 ms, and the DAG 802 has complete resource utilization (e.g., complete and/or full accuracy/quality/confidence)). If the requested response time is 700 ms and/or the requested response quality is high and/or complete, the on-the-fly DAG reorganization system 102 can generate the DAG 808 (e.g., 660 ms is less than and/or equal to 700 ms, and the DAG 808 has complete resource utilization (e.g., complete and/or full accuracy/quality/confidence)). If the requested response time is 500 ms and/or the requested response quality is intermediate, the on-the-fly DAG reorganization system 102 can generate the DAG 804 (e.g., 360 ms is less than and/or equal to 500 ms, and the DAG 804 has intermediate resource utilization (e.g., intermediate completeness, confidence, accuracy, and/or quality). If the requested response time is 200 ms and/or the requested response quality is low, the on-the-fly DAG reorganization system 102 can generate the DAG 806 (e.g., 110 ms is less than and/or equal to 200 ms, and the DAG 806 has low resource utilization (e.g., low completeness, confidence, accuracy, and/or quality).

In some cases, the requested response time 302 can be inconsistent with the requested response quality. That is, no possible DAG based on the N nodes of the computing service 106 can be constructed that can execute as quickly as required by the requested response time 302 while simultaneously exhibiting as high an accuracy/completeness/confidence level as required by the requested response quality 304. In such case, the on-the-fly DAG reorganization system 102 can inform the computing client 104 of the conflict and/or can suggest altering either the requested response time 302 and/or the requested response quality 304.

It should be appreciated that the DAG 802, the DAG 804, the DAG 806, and the DAG 808 are exemplary and non-limiting only. In some cases, other DAGs can be generated based on the execution matrix 500.

Figure 9:
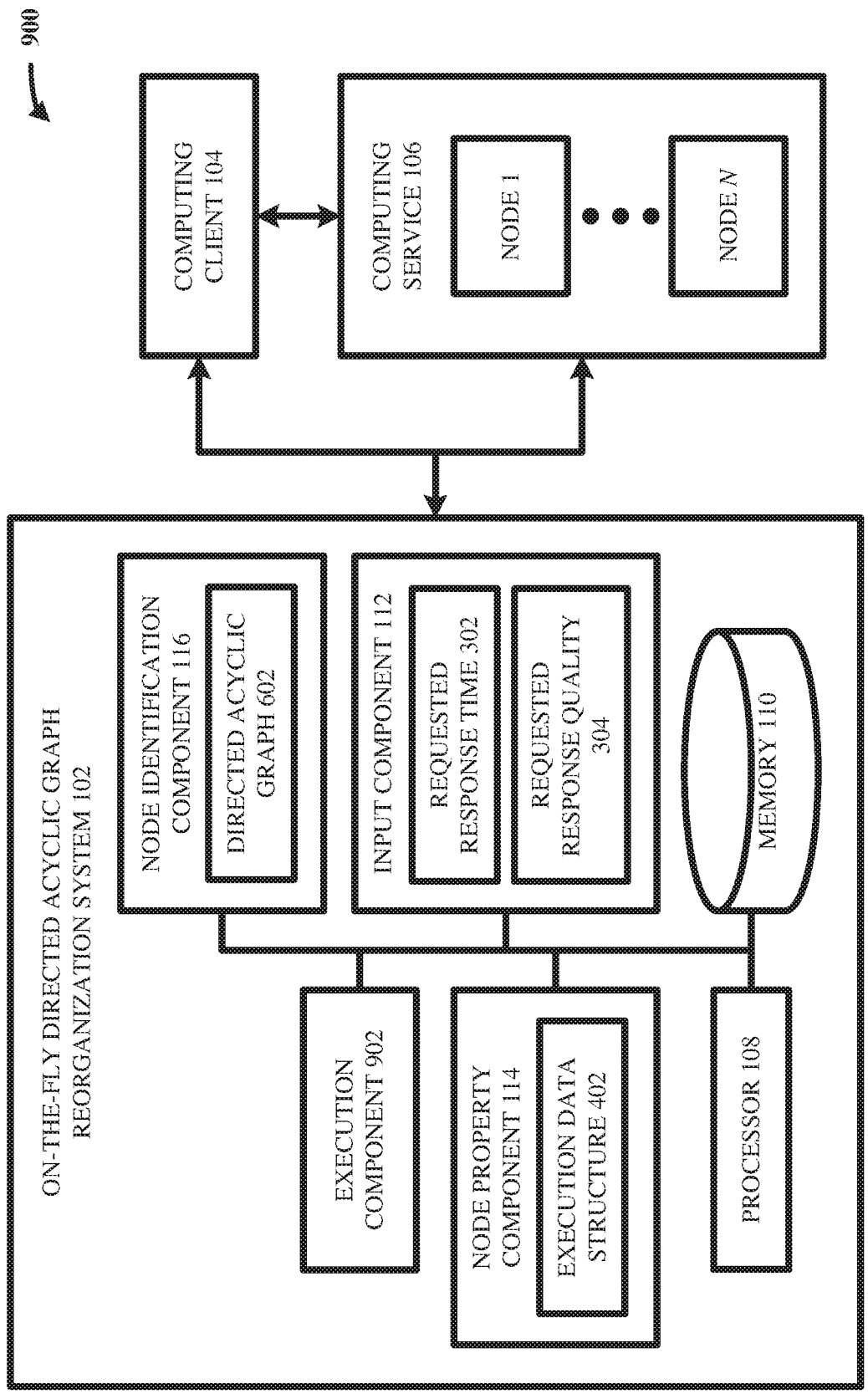
FIG. 9 illustrates a high-level block diagram of an example, non-limiting system including an execution component that facilitates on-the-fly reorganization of directed acyclic graph nodes of a computing service in accordance with one or more embodiments described herein.

FIG. 9 illustrates a high-level block diagram of an example, non-limiting system 900 including an execution component that can facilitate on-the-fly reorganization of directed acyclic graph nodes of a computing service in accordance with one or more embodiments described herein. In various aspects, the system 900 can comprise the same components as the system 600, and can further comprise an execution component 902.

In various embodiments, the execution component 902 can actually execute and/or implement the DAG 602. This can cause the computing client 104 to actually integrate and/or interact with the DAG 602 (e.g., to integrate and/or interact with that version and/or instance of the computing service 106). In other words, real-world results can be accomplished by various embodiments of the subject innovation.

Figure 10:
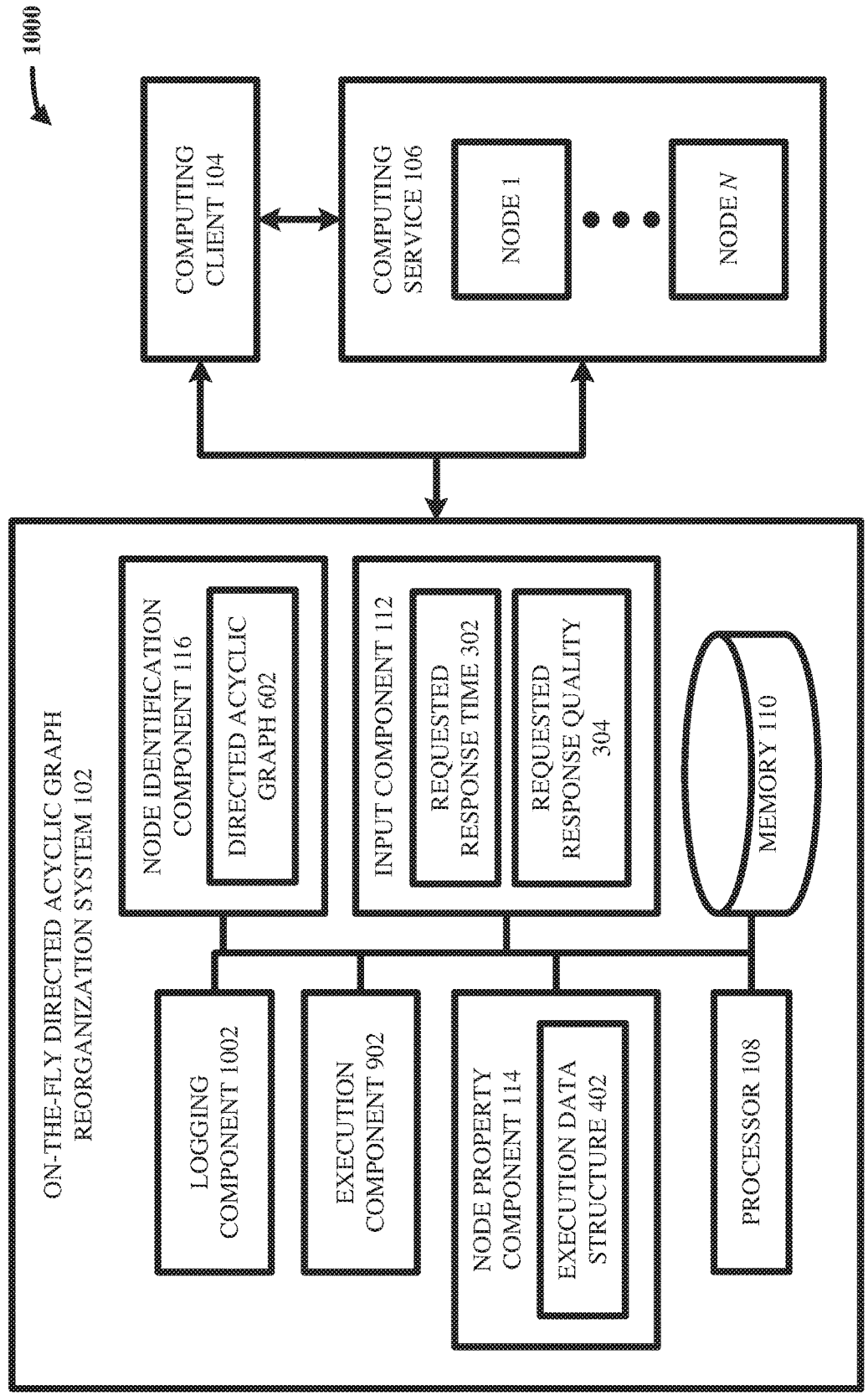
FIG. 10 illustrates a high-level block diagram of an example, non-limiting system including a logging component that facilitates on-the-fly reorganization of directed acyclic graph nodes of a computing service in accordance with one or more embodiments described herein.

FIG. 10 illustrates a high-level block diagram of an example, non-limiting system 1000 including a logging component that can facilitate on-the-fly reorganization of directed acyclic graph nodes of a computing service in accordance with one or more embodiments described herein. In various aspects, the system 1000 can comprise the same components as the system 900, and can further comprise a logging component 1002.

In various embodiments, the logging component 1002 can monitor, record, track, document, poll, and/or otherwise log actual executions of the N nodes of the computing service 106. In various aspects, the logging component 1002 can perform such monitoring, recording, tracking, documenting, polling, and/or logging in real-time. In some cases, the logging component 1002 can perform such monitoring, recording, tracking, documenting, polling, and/or logging for any suitable amount of time. In various aspects, the logging component 1002 can employ any suitable mathematical and/or statistical technique to derive one or more execution properties of the N nodes based on the monitored, recorded, tracked, documented, polled, and/or logged executions of the N nodes. For instance, the logging component 1002 can generate average execution times for the N nodes of the computing service 106, based on the monitored, recorded, tracked, documented, polled, and/or logged executions. In various aspects, the logging component 1002 can update the execution data structure 402 based on the newly generated and/or derived execution properties of the N nodes of the computing service 106. For instance, the logging component 1002 can, in some cases, transmit, input, and/or write the newly generated and/or updated average execution times of the N nodes into the execution data structure 402. In this way, the execution properties of the execution data structure 402 can be kept up-to-date and/or recent.

Figure 11:
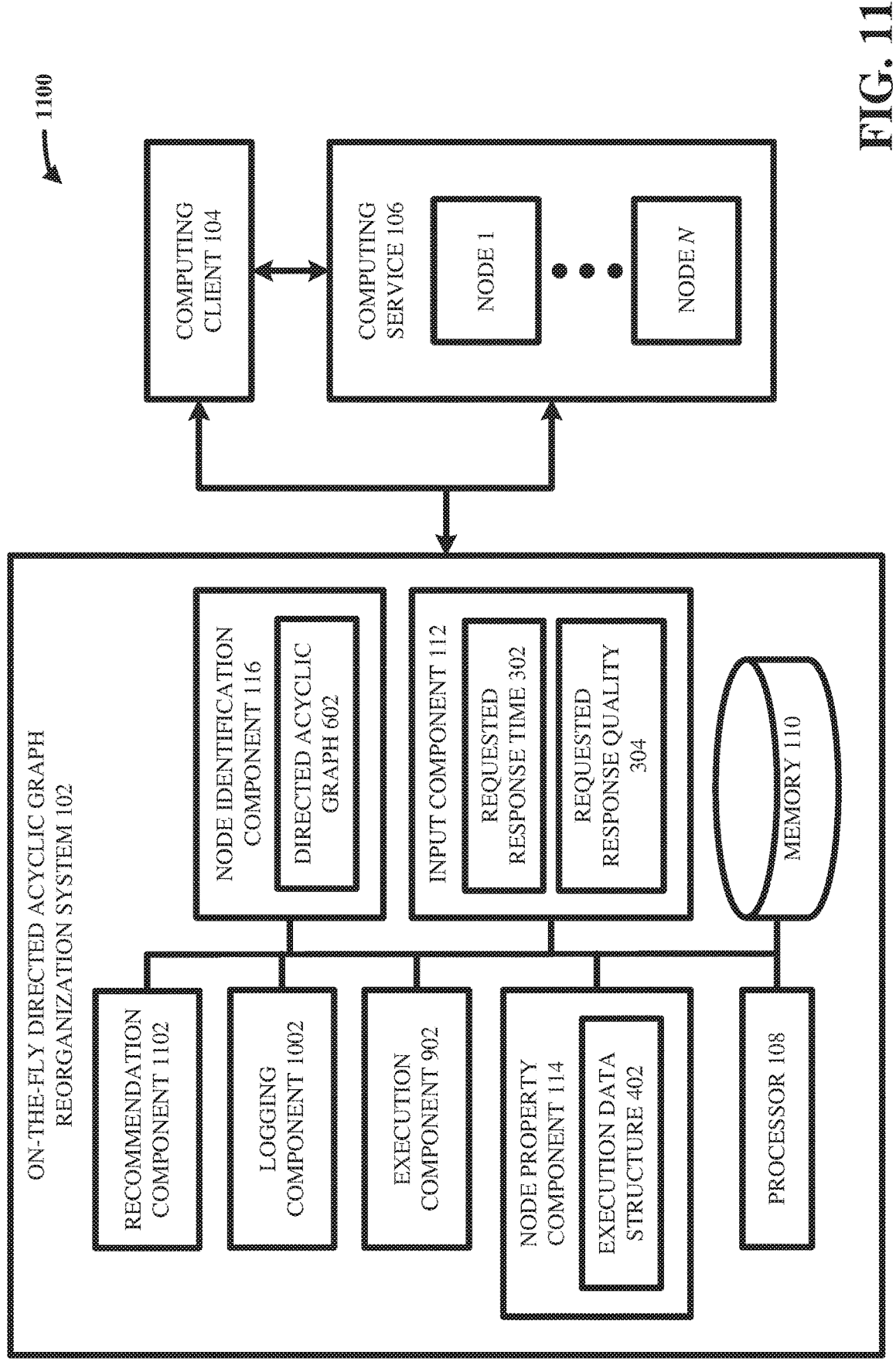
FIG. 11 illustrates a high-level block diagram of an example, non-limiting system including a recommendation component that facilitates on-the-fly reorganization of directed acyclic graph nodes of a computing service in accordance with one or more embodiments described herein.

FIG. 11 illustrates a high-level block diagram of an example, non-limiting system 1100 including a recommendation component that can facilitate on-the-fly reorganization of directed acyclic graph nodes of a computing service in accordance with one or more embodiments described herein. In various aspects, the system 1100 can comprise the same components as the system 1000, and can further comprise a recommendation component 1102.

In various aspects, the recommendation component 1102 can provide and/or transmit to the computing client 104 an electronic message in response to the requested response time 302 and/or the requested response quality 304. In various aspects, the electronic message can indicate a maximum achievable level of quality, accuracy, confidence, and/ or completeness that can be achieved within the requested response time 302. For example, consider again the DAG 802, the DAG 804, the DAG 806, and the DAG 808. If the requested response time 302 is 750 ms, the recommendation component 1102 can inform the computing client 104 that full accuracy, completeness, quality, and/or confidence can be achieved within the requested response time 302 (e.g., the DAG 802 and the DAG 808 can provide fully complete responses within 750 ms). If the requested response time 302 is instead 700 ms, the recommendation component 1102 can still inform the computing client 104 that full accuracy, completeness, quality, and/or confidence can be achieved within the requested response time 302 (e.g., the DAG 808 can provide fully complete responses within 700 ms). If the requested response time 302 is instead 400 ms, the recommendation component 1102 can inform the computing client 104 that intermediate accuracy, completeness, quality, and/or confidence can be achieved within the requested response time 302 (e.g., the DAG 804 can provide intermediately complete responses within 400 ms). If the requested response time 302 is instead 200 ms, the recommendation component 1102 can inform the computing client 104 that low accuracy, completeness, quality, and/or confidence can be achieved within the requested response time 302 (e.g., the DAG 806 can provide lowly complete and/or incomplete responses within 200 ms).

In various aspects, the recommendation component 1102 can further inform the computing client 104 of an improvement in accuracy and/or completeness that can be gained if the requested response time 302 is increased by a predetermined amount. For example, if the requested response time 302 is 400 ms, the recommendation component 1102 can inform the computing client 104 that intermediate accuracy, completeness, quality, and/or confidence can be achieved within the requested response time 302, and can further inform the computing client 104 that full accuracy, completeness, quality, and/or confidence can be generated if the requested response time 302 is increased by 260 ms (e.g., the DAG 808 can provide a fully complete and/or fully accurate response within 660 ms, which is 260 ms greater than the requested response time 302). As another example, if the requested response time 302 is 200 ms, the recommendation component 1102 can inform the computing client 104 that a low accuracy, completeness, quality, and/or confidence can be achieved within the requested response time 302, and can further inform the computing client 104 that an intermediately accuracy, completeness, quality, and/or confidence can be generated if the requested response time 302 is increased by 160 ms (e.g., the DAG 804 can provide an intermediately complete and/or intermediately accurate response within 360 ms, which is 160 ms greater than the requested response time 302).

In some cases, the requested response time 302 can be inconsistent with the requested response quality 304. This can mean that there is no possible version and/or instance of the computing service 106 that can execute as quickly as required by the requested response time 302 and that can also execute with an accuracy, quality, confidence, and/or completeness required by the requested response quality 304. In such cases, the recommendation component 1102 can inform the computing client 104 of the conflict, and/or can suggest changing at least one of the requested response time 302 and/or the requested response quality 304.

In some cases, the recommendation component 1102 can recommend a change in the requested response time 302 based on one or more other computing services that are downstream of the computing service 106. As mentioned above, in some cases, the input component 112 can receive from the computing client 104 a computing request that the computing client 104 desires to be processed by the computing service 106. In some cases, the computing request can require subsequent processing by one or more other computing services that are downstream of the computing service 106. In various aspects, those one or more other computing services can have processing requirements; that is, the input of those one or more other computing services can be required to meet a threshold level of quality, accuracy, confidence, and/or completeness. Since the one or more other computing services are downstream of the computing service 106, they can receive as input the output that is generated by the computing service 106. Thus, for proper processing and/or handling of the computing request, the output of the computing service 106 can be required to meet that threshold level of quality, accuracy, confidence, and/or completeness. In some instances, the requested response time 302 can be so low and/or short as to cause the DAG 602 (e.g., the generated version of computing service 106) to exhibit a quality, accuracy, confidence, and/or completeness level that is below the threshold level required by the one or more other computing services downstream of the computing service 106. In such case, the recommendation component 1102 can inform the computing client 104 that, even though a version of the computing service 106 can satisfy the requested response time 302, the requested response time 302 is too low/short in view of the one or more other computing services that are needed to fully handle the computing request. Thus, the recommendation component 1102 can, in some cases, suggest that the computing client 104 appropriately amend (e.g., increase) the requested response time 302. In some cases, the recommendation component 1102 can calculate and/or estimate an appropriate amount by which to amend and/or increase the requested response time 302 (e.g., such that the level of accuracy, quality, confidence, and/or completeness of the computing service 106 satisfies the processing requirements of the one or more other computing services).

In various aspects, the recommendation component 1102 can facilitate its functionality by employing any suitable machine learning classifier and/or artificial intelligence algorithm.

Figure 12:
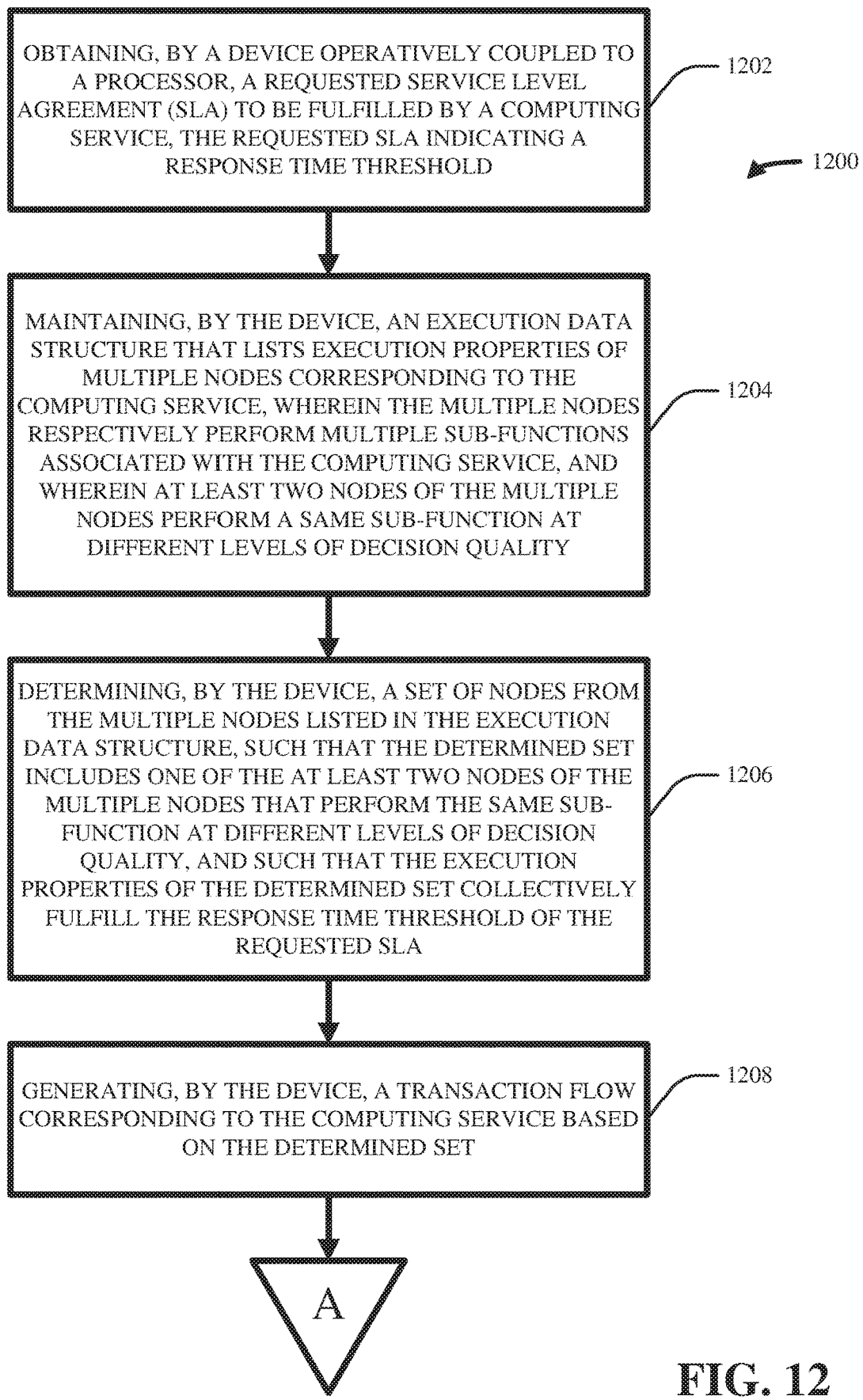
FIG. 12 illustrates a high-level flow diagram of an example, non-limiting computer-implemented method that facilitates on-the-fly reorganization of directed acyclic graph nodes of a computing service in accordance with one or more embodiments described herein.

FIG. 12 illustrates a high-level flow diagram of an example, non-limiting computer-implemented method 1200 that can facilitate on-the-fly reorganization of directed acyclic graph nodes of a computing service in accordance with one or more embodiments described herein.

In various embodiments, act 1202 can include obtaining, by a device operatively coupled to a processor (e.g., 112), a requested service level agreement (SLA) to be fulfilled by a computing service (e.g., 106). In various aspects the requested SLA can indicate a response time threshold (e.g., 302).

In various instances, act 1204 can include maintaining, by the device (e.g., 114), an execution data structure (e.g., 402 and/or 500), that lists execution properties of multiple nodes (e.g., the N total nodes) corresponding to the computing service. In various aspects, the multiple nodes can respectively perform multiple sub-functions (e.g., the F sub-functions and/or sub-operations) associated with the computing service. In various cases, at least two nodes of the multiple nodes can perform a same sub-function at different levels of decision quality (e.g., at least one multi-level-of-execution subset can be in the multiple nodes).

In various aspects, act 1206 can include determining, by the device (e.g., 116), a set of nodes from the multiple nodes listed in the execution data structure. In various instances, the determined set can include one of the at least two nodes of the multiple nodes that perform the same sub-function at different levels of decision quality (e.g., can include one node from each multi-level-of-execution subset). In various aspects, the execution properties of the determined set can collectively fulfill the response time threshold of the requested SLA.

In various instances, act 1208 can include generating, by the device (e.g., 116), a transaction flow (e.g., 602) corresponding to the computing service based on the determined subset.

Figure 13:
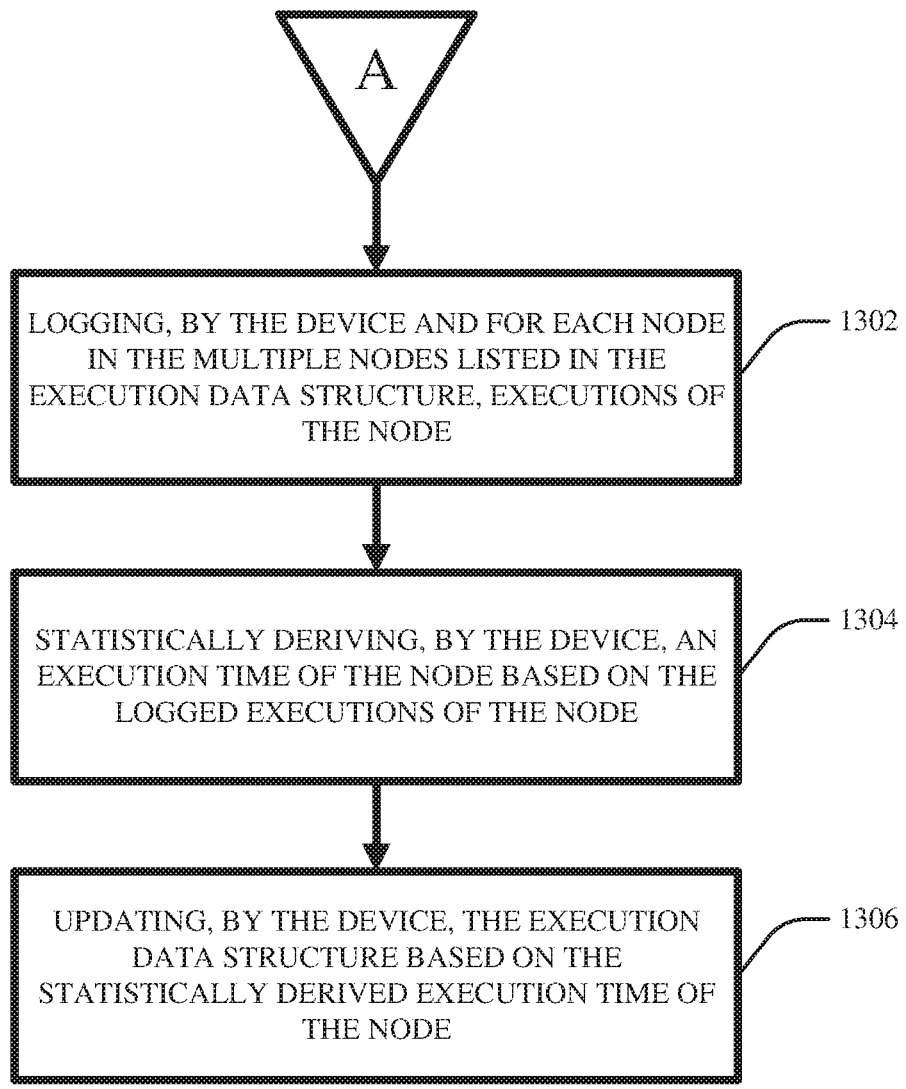
FIG. 13 illustrates a high-level flow diagram of an example, non-limiting computer-implemented method that facilitates on-the-fly reorganization of directed acyclic graph nodes of a computing service in accordance with one or more embodiments described herein.

FIG. 13 illustrates a high-level flow diagram of an example, non-limiting computer-implemented method 1300 that can facilitate on-the-fly reorganization of directed acyclic graph nodes of a computing service in accordance with one or more embodiments described herein. In various aspects, the computer-implemented method 1300 can comprise the same acts as the computer-implemented method 1200, and can further comprise acts 1302-1306.

In various embodiments, act 1302 can include logging, by the device (e.g., 1002) and for each node in the multiple nodes listed in the execution data structure, executions of the node.

In various instances, act 1304 can include statistically deriving, by the device (e.g., 1002), an execution time of the node based on the logged executions of the node.

In various aspects, act 1306 can include updating, by the device (e.g., 1002), the execution data structure based on the statistically derived execution time of the node.

Figure 14:
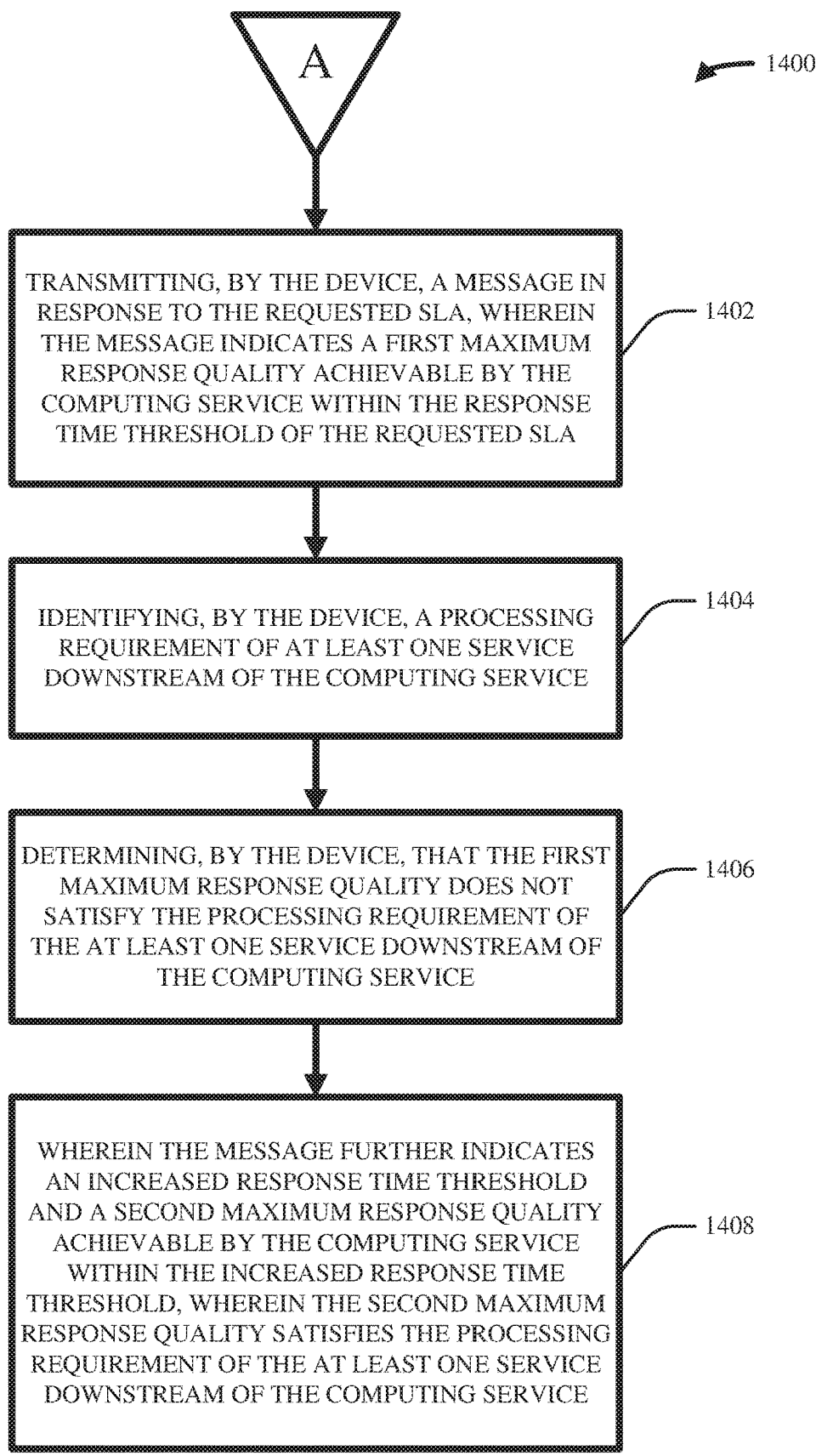
FIG. 14 illustrates a high-level flow diagram of an example, non-limiting computer-implemented method that facilitates on-the-fly reorganization of directed acyclic graph nodes of a computing service in accordance with one or more embodiments described herein.

FIG. 14 illustrates a high-level flow diagram of an example, non-limiting computer-implemented method 1400 that can facilitate on-the-fly reorganization of directed acyclic graph nodes of a computing service in accordance with one or more embodiments described herein. In various aspects, the computer-implemented method 1400 can comprise the same acts as the computer-implemented method 1200, and can further comprise acts 1402-1408.

In various embodiments, act 1402 can include transmitting, by the device (e.g., 1102), a message in response to the requested SLA. In various aspects, the message can indicate a first maximum response quality achievable by the computing service within the response time threshold of the requested SLA.

In various aspects, act 1404 can include identifying, by the device (e.g., 1102), a processing requirement of at least one service downstream of the computing service.

In various instances, act 1406 can include determining, by the device (e.g., 1102), that the first maximum response quality does not satisfy the processing requirement of the at least one service downstream of the computing service.

In various aspects, as shown in numeral 1408, the message can further indicate an increased response time threshold and a second maximum response quality achievable by the computing service within the increased response time threshold. In various cases, the second maximum response quality can satisfy the processing requirement of the at least one service downstream of the computing service.

In various aspects, embodiments of the subject innovation can create an on-the-fly runtime DAG in a decision service for a requested SLA by a computing client. In various aspects, each DAG node can keep track of an average execution time, an execution mode (e.g., possibility of executing synchronously and/or asynchronously with known volatility, such as a database write and/or event with eventual consistency), a criticality of the node (e.g., mandatory like a request validator), and/or whether a node is light weight with possible degradation of data (e.g., a cache call). When an http/s request is made with a stipulated SLA and an agreement on a best-effort contract, an on-the-fly DAG can be created with the available metadata, such that the DAG can provide responses to the computing client within the stipulated time.

Figure 15:
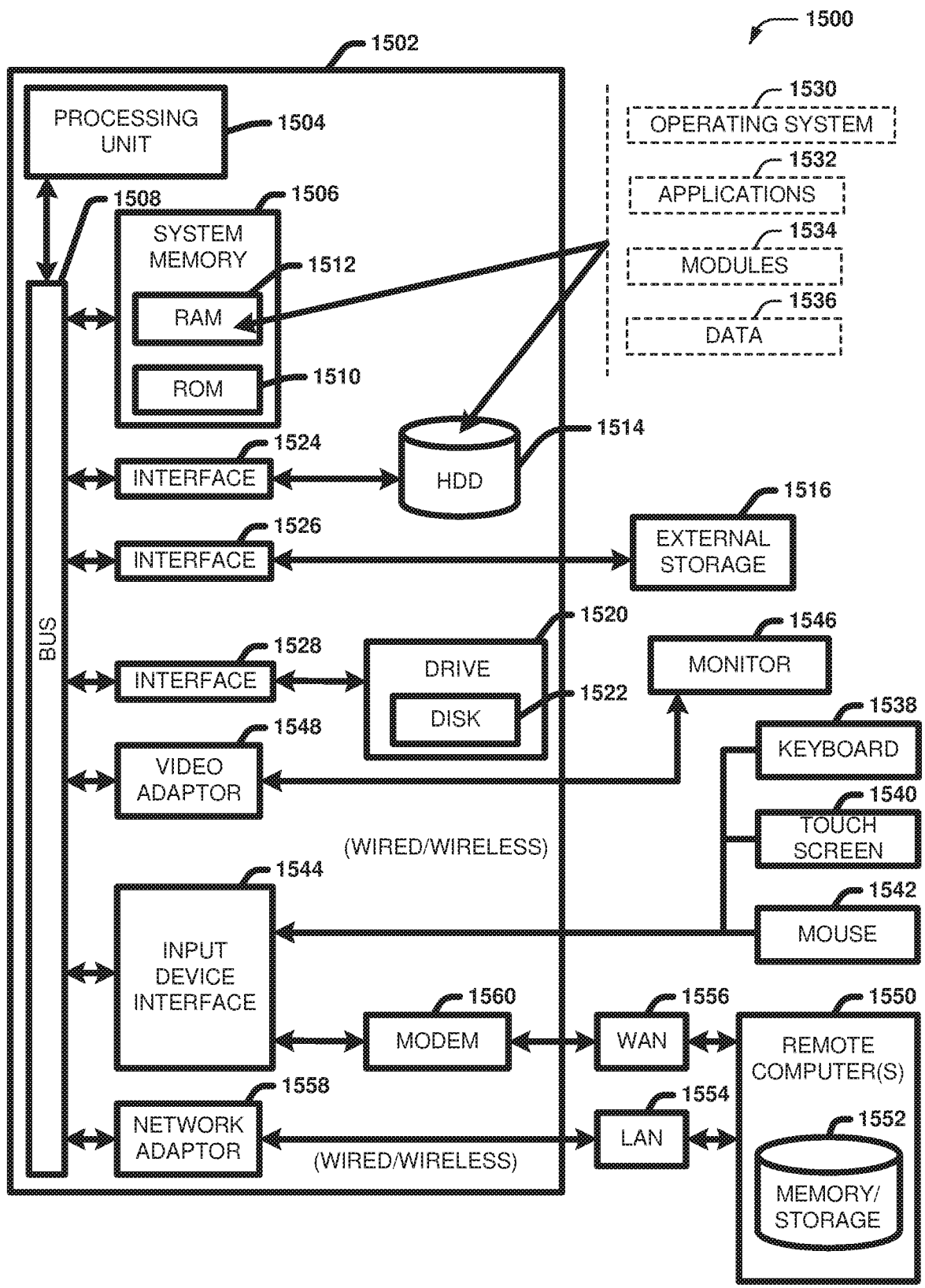
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
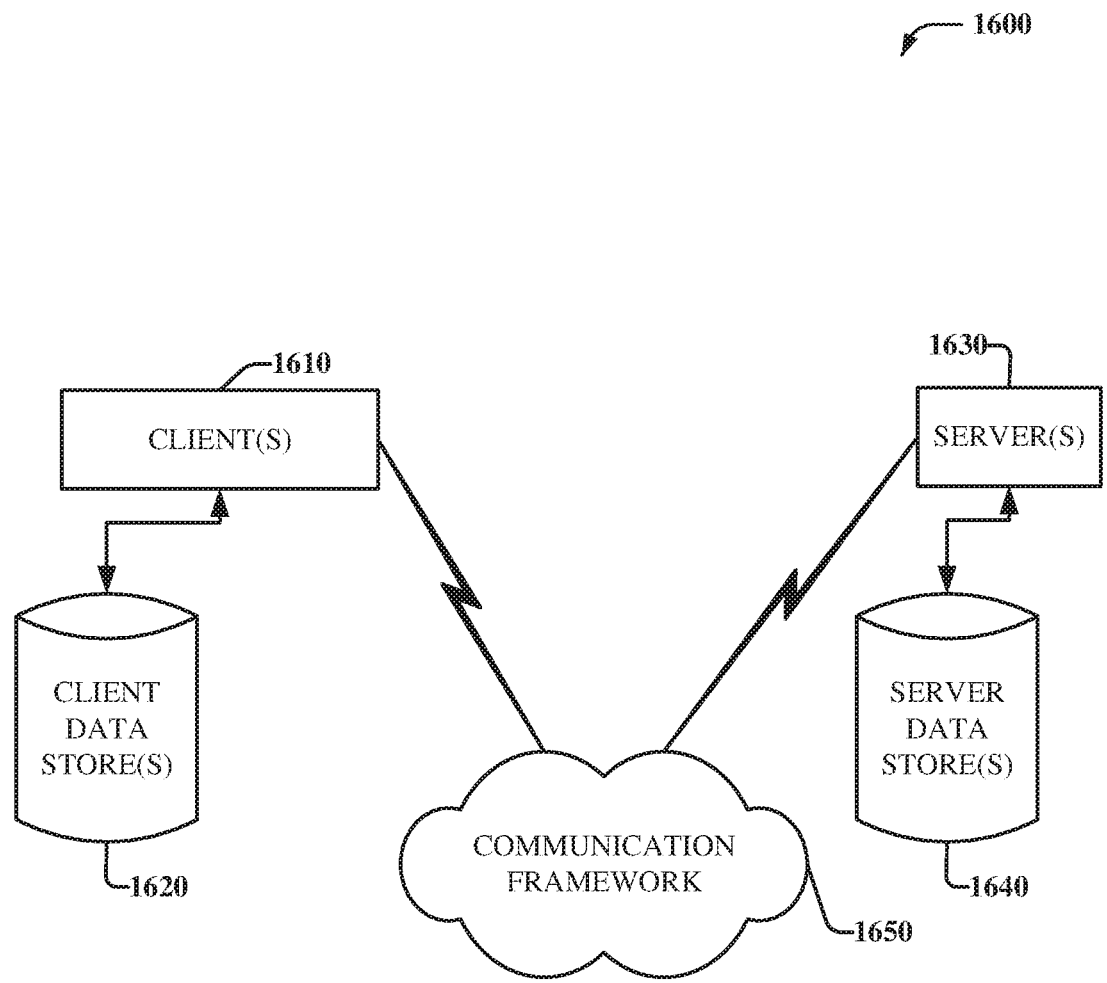
FIG. 16 illustrates an example networking environment operable to execute various implementations described herein.

FIG. 16 is a schematic block diagram of a sample computing environment 1600 with which the disclosed subject matter can interact. The sample computing environment 1600 includes one or more client(s) 1610. The client(s) 1610 can be hardware and/or software (e.g., threads, processes, computing devices). The sample computing environment 1600 also includes one or more server(s) 1630. The server(s) 1630 can also be hardware and/or software (e.g., threads, processes, computing devices). The servers 1630 can house threads to perform transformations by employing one or more embodiments as described herein, for example. One possible communication between a client 1610 and a server 1630 can be in the form of a data packet adapted to be transmitted between two or more computer processes. The sample computing environment 1600 includes a communication framework 1650 that can be employed to facilitate communications between the client(s) 1610 and the server(s) 1630. The client(s) 1610 are operably connected to one or more client data store(s) 1620 that can be employed to store information local to the client(s) 1610. Similarly, the server(s) 1630 are operably connected to one or more server data store(s) 1640 that can be employed to store information local to the servers 1630.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a memory, the computer-executable components comprising:
an input component that receives from a computing client a requested response time to be satisfied by a computing service;
a node property component that accesses an execution matrix, wherein the execution matrix lists execution properties of a plurality of nodes corresponding to the computing service, wherein the plurality of nodes respectively perform a plurality of sub-operations associated with the computing service, and wherein the plurality of nodes include one or more multi-level-of-execution subsets of nodes, each multi-level-of-execution subset containing at least two nodes that facilitate a same sub-operation at different levels of resource utilization; and
a node identification component that identifies a set of nodes from the plurality of nodes listed in the execution matrix such that the identified set includes one node from each of the one or more multi-level-of-execution subsets and such that the execution properties of the identified set collectively satisfy the requested response time, and generates for the computing client a workflow corresponding to the computing service based on the identified set.

2. The system of claim 1, further comprising:

an execution component that executes the workflow, thereby causing the computing service to provide a response to the computing client within the requested response time.

3. The system of claim 1, wherein for each node of the plurality of nodes listed in the execution matrix, the execution properties indicate whether the node is mandatory or optional for the computing service, indicate whether the node is executable synchronously or asynchronously, and indicate an execution time of the node.

4. The system of claim 1, wherein the node identification component identifies the set of nodes based on a requested response quality specified by the computing client, such that the execution properties of the identified set collectively satisfy the requested response quality.

5. The system of claim 1, further comprising:

a recommendation component that transmits a message to the computing client in response to the requested response time, wherein the message indicates a first maximum response quality achievable by the computing service within the requested response time.

6. The system of claim 5, wherein the recommendation component identifies a processing requirement of at least one service downstream of the computing service, and determines that the first maximum response quality does not satisfy the processing requirement of the at least one service downstream of the computing service.

7. The system of claim 6, wherein the message further indicates an increased response time and a second maximum response quality achievable by the computing service within the increased response time, wherein the second maximum response quality satisfies the processing requirement of the at least one service downstream of the computing service.

8. The system of claim 1, wherein the identified set is based at least partially on a load distribution among the plurality of nodes.

9. A computer-implemented method, comprising:

obtaining, by a device operatively coupled to a processor, a requested service level agreement ("SLA") to be fulfilled by a computing service, the requested SLA indicating a response time threshold;

maintaining, by the device, an execution data structure that lists execution properties of multiple nodes corresponding to the computing service, wherein the multiple nodes respectively perform multiple sub-functions associated with the computing service, and wherein at least two nodes of the multiple nodes perform a same sub-function at different levels of decision quality;

determining, by the device, a set of nodes from the multiple nodes listed in the execution data structure, such that the determined set includes one of the at least two nodes of the multiple nodes that perform the same sub-function at different levels of decision quality, and such that the execution properties of the determined set collectively fulfill the response time threshold of the requested SLA; and generating, by the device, a transaction flow corresponding to the computing service based on the determined set.

10. The computer-implemented method of claim 9, further comprising:

executing, by the device, the transaction flow, thereby causing the computing service to provide a response within the response time threshold of the requested SLA.

11. The computer-implemented method of claim 9, wherein for each node of the multiple nodes listed in the execution data structure, the execution properties indicate whether the node is mandatory or optional for the computing service, indicate whether the node is executable synchronously or asynchronously, and indicate an execution time of the node.

12. The computer-implemented method of claim 9, wherein the requested SLA further indicates a response quality threshold to be fulfilled by the computing service, and wherein the determining the set of nodes from the multiple nodes is based on the response quality threshold, such that the execution properties of the determined set collectively fulfill the response quality threshold.

13. The computer-implemented method of claim 9, further comprising:

transmitting, by the device, a message in response to the requested SLA, wherein the message indicates a first maximum response quality achievable by the computing service within the response time threshold of the requested SLA.

14. The computer-implemented method of claim 13, further comprising:

identifying, by the device, a processing requirement of at least one service downstream of the computing service; and determining, by the device, that the first maximum response quality does not satisfy the processing requirement of the at least one service downstream of the computing service.

15. The computer-implemented method of claim 14, wherein the message further indicates an increased response time threshold and a second maximum response quality achievable by the computing service within the increased response time threshold, wherein the second maximum response quality threshold satisfies the processing requirement of the at least one service downstream of the computing service.

16. The computer-implemented method of claim 9, wherein the determined set is based on a load distribution among the multiple nodes.

17. A computer program product for facilitating on-the-fly reorganization of directed acyclic graph nodes of a computing service for high integration flexibility, the computer program product comprising a computer readable memory having program instructions embodied therewith, the program instructions executable by a processor to cause the processor to:

receive a requested maximum processing time to be satisfied by a computing service;

access execution properties of a group of nodes corresponding to the computing service, wherein the group of nodes respectively perform sub-operations associated with the computing service, and wherein at least two nodes in the group of nodes perform a same sub-operation at different levels of decision confidence;

identify a set of nodes from the group of nodes such that the identified set includes one of the at least two nodes that perform the same sub-operation at different levels of decision confidence, and such that the execution properties of the identified set collectively satisfy the requested maximum processing time; and arrange the identified set into a workflow corresponding to the computing service.

18. The computer program product of claim 17, wherein the program instructions are further executable to cause the processor to:
execute the workflow, thereby causing the computing service to provide a result within the requested maximum processing time.

19. The computer program product of claim 17, wherein for each node in the group of nodes, the execution properties indicate whether the node is required for the computing service, indicate whether the node is executable sequentially or in parallel, and indicate a processing time of the node.

20. The computer program product of claim 19, wherein the program instructions are further executable to cause the processor to:
identify the set of nodes from the group of nodes based on a minimum decision quality accompanying the maximum processing time, such that the execution properties of the identified set collectively satisfy the minimum decision quality.

* * * * *